(12) United States Patent
Nakayama et al.

(10) Patent No.: US 7,180,217 B2
(45) Date of Patent: Feb. 20, 2007

(54) MOTOR, METHOD FOR MANUFACTURING MOTOR, AND MOTOR DRIVE CONTROLLER

(75) Inventors: Sachio Nakayama, Gunma (JP); Masaru Wada, Gunma (JP); Yoshiyuki Watanabe, Gunma (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 11/039,914

(22) Filed: Jan. 24, 2005

(65) Prior Publication Data

US 2005/0189828 A1 Sep. 1, 2005

Related U.S. Application Data

(63) Continuation-in-part of application No. PCT/JP03/09018, filed on Jul. 16, 2003.

(30) Foreign Application Priority Data

| Jul. 22, 2002 | (JP) | 2002-212381 |
| Aug. 7, 2002 | (JP) | 2002-229989 |
| Sep. 6, 2002 | (JP) | 2002-260726 |
| Oct. 3, 2002 | (JP) | 2002-290692 |

(51) Int. Cl.
*H02K 3/00* (2006.01)
*H02K 1/00* (2006.01)
*H02K 11/00* (2006.01)

(52) U.S. Cl. .................. 310/179; 310/180
(58) Field of Classification Search ........ 310/216, 310/179, 180, 184, 185, 198
See application file for complete search history.

(56) References Cited

U.S. PATENT DOCUMENTS 5,097,166 A * 3/1992 Mikulic ............ 310/156.83
6,049,153 A * 4/2000 Nishiyama et al. .... 310/156.53

FOREIGN PATENT DOCUMENTS

| JP | 138240/1983 A | 4/1985 |
| JP | 6-22486 A | 1/1994 |
| JP | 6-153424 A | 5/1994 |
| JP | 6-233483 A | 8/1994 |
| JP | 7-67306 A | 3/1995 |
| JP | 9-65679 A | 3/1997 |
| JP | 10-126982 A | 5/1998 |
| JP | 11-178297 A | 7/1999 |
| JP | 11-178298 A | 7/1999 |
| JP | 11-356083 A | 12/1999 |
| JP | 2000-201461 A | 7/2000 |
| JP | 2000-333418 A | 11/2000 |
| JP | 2001-86695 A | 3/2001 |
| JP | 2001-103700 A | 4/2001 |
| JP | 2001-352780 A | 12/2001 |
| JP | 2002-369569 A | 12/2002 |
| WO | WO 94/22206 A1 | 9/1994 |

* cited by examiner

*Primary Examiner*—Tran Nguyen
(74) *Attorney, Agent, or Firm*—Sughrue Mion, PLLC

(57) ABSTRACT

A motor comprising a motor-wiring bus bar including a plurality of annular ring conductors connecting lead wires of the motor including a stator in which a plurality of stator cores having the lead wires is arranged in a circle or connecting the lead wires and a power line together and a plurality of terminals attached to the ring conductors. The ring conductors are different in diameter and arranged concentrically on a same plane.

6 Claims, 18 Drawing Sheets

STATOR COIL

(A)           (B)

(A)          (B)

MOTOR, METHOD FOR MANUFACTURING MOTOR, AND MOTOR DRIVE CONTROLLER

The present application is a Continuation-in-Part of International Application PCT/JP2003/09018, with an international filing date of Jul. 16, 2003, the disclosure of which is incorporated into this application by reference; the present application is further based on Japanese Patent Application No. 2002-212381, 2002-229989, 2002-260726 and 2002-290692 the disclosures of which is also incorporated into this application by reference.

FIELD OF THE INVENTION

The present invention relates to a motor, a method for manufacturing the motor, and a motor drive controller. More particularly, the invention relates to a motor including a motor-wiring bus bar used for electrically connecting a lead wire wound around a stator core and its manufacturing method, relates to a permanent-magnet motor which requires low cogging torque, low torque ripple, and high output with compact size and which includes a rectangular-wave driven distributed-coil stator, relates to a brushless DC motor used in an electrically driven power steering system having no motor lock and in which size reduction, low torque ripple, and low cost are achieved, and relates to a brushless-motor drive controller in which the toque ripple is reduced with high rpm in a low-torque load range.

BACKGROUND

Bus bars have been used to connect lead wires (hereinafter, referred to as coils) wound around motor stator cores in view of assemble efficiency. For example, JP-A-2001-103700 and JP-A-2001-86695 describe that bus bars are used because of their high connection efficiency and that the bus bars are manufactured by stamping copper plates.

Referring to FIGS. 1 and 2, the conventional motor-wiring bus bar (hereinafter, simply referred to as a bus bar) will be briefly described. FIG. 1 shows the mechanical structure of a brushless DC motor. FIG. 2 shows the electrical circuit thereof.

The mechanical structure will first be described. Referring to FIG. 1, a stator 1000 includes stator cores 51-U, 51-V, 51-W, 52-U, and 52-W corresponding to U-phase, V-phase, and W-phase, respectively, and coils 101-U, 101-V, 101-W, 102-U, 102-V, and 102-W wound around the respective cores. The connection of the coils will then be described. For example, for the U-phase, one ends of the coils 101-U and 102-U are connected to a ring-shaped U-phase bus bar 1-U and the other ends are connected to a ring-shaped N-phase bus bar 1-N. For the V-phase, one ends of the coils 101-V and 102-V are connected to a ring-shaped V-phase bus bar 1-V and the other ends are connected to a ring shaped N-phase bus bar 1-N. The coils of W-phase are also connected similarly. The connection between the coils and the bus bars in FIG. 1 shows electrical connection, in which specific connecting means are not generally electrical wires but engagement of bus bars with coils. Accordingly, since the connection with the ring-shaped bus bars is easier than that with electrical wires, it is useful in increasing assembly efficiency.

Referring now to FIG. 2, the electrical connection will be described. A three-phase current is generated by an inverter including a power source DC and switches SU, SV, SW, SX, SY, and SZ, which is fed through power lines YU, YV, and YW to the coils 101-U, 102-U, 101-V, 102-V, 101-W, and 102-W of the stator 1000. In this example, since the coils are in Y-connection, one ends of the coils are connected with the U-, V-, W-phase bus bars 1-U, 1-V, and 1-W in correspondence with the respective phases and all of the other ends of the coils are connected with the neutral-point bus bar 1-N.

The operation of a motor with the mechanical and electrical structure will be briefly described. A three-phase current is fed to the coils of the motor by the inverter including the DC power source and the switches. The current is fed to the power lines YU, YV, and YW, the bus bars, and the coils, which will be specifically described with the U-phase as an example. The U-phase current flows through the power line YU into a terminal 33-U of the U-phase bus bar 1-U, passes through a U-phase ring conductor 2-U and is fed from a terminal 31-U to the coil 101-U or from a terminal 32-U to the coil 102-U. The current flowing through the coils 101-U and 102-U flows into the bus bar 1-N and then flows from the terminals of the bus bar 1-N into the V-phase coils 101-V and 102-V and the W-phase coils 101-W and 102-W. The currents in the coils 101-V and 102-V join together through terminals 31-V and 32-V of the bus bar 1-V at the bus bar 1-V and returns from a terminal 33-V through the power line YV to the DC power source. Also the W-phase coil current passes through the bus bar 1-W and returns to the DC power source. The three-phase current flowing through the U-, V-, and W-phase coils generates a rotary magnetic field to rotate a rotor (not shown), thereby driving the motor.

As will be understood from the fact that the coil currents flow into the bus bars to join together and flow out therefrom, the bus bars are very important members to combine the currents.

The conventional motors using the ring-shaped bus bar, however, have a structural problem in achieving size reduction. Specifically, referring to FIG. 3, since the stack of ring-shaped bus bars 1-U, 1-V, 1-W, and 1-N is used, it is four times as thick as that of the bus bar (four bus bars of U-, V-, W-, and N-phase), having a problem in reducing the size of the motor.

Also the method for manufacturing the motor including the ring-shaped bus bars has the following problem: The ring conductors have been made by stamping, thus having the problem that the remaining of the stamped member is wasted.

The present invention has been made in view of the above problems. Accordingly, it is a first object of the invention to provide a motor including a motor-wiring bus bar suitable for size reduction and a method for manufacturing a motor including an economical motor-wiring bus bar which makes good use of the member.

When low torque ripple is required for permanent-magnet motors with conventional rectangular wave drive (120-degree energization system), distributed winding has been adopted for coils. In this case, the equation (1) holds from the relationship between a possible number of poles, 2p, of the motor including the distributed coils and the number of slots, S $$S/2\,pm = \text{integer} \tag{1}$$

where m is the number of phases of the motor.

Since a cogging torque is in inverse proportion to the least common multiple of the number of poles, 2p, and the number of slots, S, it produces the problem of significantly increasing the cogging torque.

In order to solve the above problems, a permanent-magnet motor is provided which is disclosed in, for example, JP-A-10-126982. The permanent-magnet motor achieves the reduction of the cogging torque by arranging the teeth such that the centers of the slot openings of the stator deviate from the positions at equal intervals. More specifically, the permanent-magnet motor includes annular permanent magnets constituting M magnetic poles (M is an even number) to construct a rotor and T teeth facing the permanent magnets arranged at irregular intervals, a winding groove (slot) between the teeth being wound with a coil, and the teeth being joined to a yoke to construct a stator. The teeth are arranged such that the centers of the slot openings of the stator deviate from the position of regular intervals T by a deviation of $\pm N \times 180/\{C(T/2+1)\}$, where C is the least common multiple of the number M of the permanent magnets and the number T of the teeth and N is an integer from 1 to T/2.

However, with the permanent-magnet motor disclosed in the above-described JP-A-10-126982, the phases of voltage induced by the coils deviate, so that harmonic component of the voltage waveform induced between the coils are eliminated. In other words, it has the problem of increasing the torque ripple when the permanent magnetic motor is driven with a rectangular-wave current.

The present invention has been made in view of the above problems. Accordingly, it is a second object of the invention to provide a permanent-magnet motor capable of achieving low cogging torque, low torque ripple, and high output with compact size, being driven with a rectangular-wave current, and including a distributed-coil stator.

In an electrically driven power steering system that energizes an automotive steering system with motor torque as auxiliary, the driving force of the motor is applied to the steering shaft or the rack shaft through a decelerator and a transfer mechanism such as a gear and a belt to energize it with an auxiliary load. Referring to FIG. 4, the simple structure of the electrically driven power steering system will be described. A shaft 102 of a steering wheel 101 is joined to tie rods 106 of wheels through a reduction gear 103, universal joints 104a and 104b, and a pinion rack mechanism 105. The shaft 102 includes a torque sensor 107 for sensing the steering torque of the steering wheel 101. A motor 108 for applying an auxiliary power to the steering wheel 101 is joined to the shaft 102 through the reduction gear 103. It is important here that the motor 108 used for an important safety component such as the electrically driven power steering system is required to have significantly high reliability.

However, the motor 108 actually has disadvantages, one of which is that, with a brushless DC motor, foreign matter is caught between the rotor and the stator to lock the motor.

Referring now to FIG. 5, the mechanism of the motor lock will be described. FIG. 5(A) shows the longitudinal section of the brushless DC motor and FIG. 5(B) shows the cross section thereof. The brushless DC motor includes a rotor 9 having a permanent magnet 9-1 mounted to the outer periphery and a stator 10 wound with coils. The stator 10 includes a stator core 12 having a plurality of teeth 11 and coils 14 wound around slots 13 between the stator core 12 and the teeth 11. Since the brushless DC motor generally uses sintered permanent magnets for the rotor, the permanent magnets are covered with a nonmagnetic metal plate or the like to prevent locking even when the permanent magnets become chipped by external impact. The stator has openings between the adjacent teeth 11 to wind the coils 14 around the stator core 12. If foreign matter 50 such as insulator chips or varnish for hardening the coil enters the space between the rotor 9 and the teeth 11 through the openings, there is a possibility that the rotor is locked. An example of the method for preventing the motor lock is adopting a divided core in which the inner peripheries of the adjacent teeth are joined together. The joining of the teeth, however, increases leakage of flux to decrease the torque constant of the brushless DC motor, thus reducing output. Also, it rapidly increases the ripple of the counter electromotive voltage to increase torque ripple, thus decreasing the operability of the electrically driven power steering system. Another lock prevention method is molding the stator and the coil and filling the adjacent openings with resin, which has a disadvantage of increasing the cost.

As described above, the sudden locking of the brushless DC motor used as an important safety component such as the electrically driven power steering system causes dangerous car driving operation.

The invention has been made in view of the above problems. Accordingly, it is a third object of the invention to provide a brushless DC motor in which the motor output does not decrease, the torque ripple is low, the cost is low, and the motor is not locked.

The brushless motors used as the primary drive of automotive power steering systems generally include three or more exciting phases, which are driven with a rectangular-wave exciting current.

For example, with a five-phase brushless motor, the motor driving circuit rotates the rotor by exciting five-phase (hereinafter, referred to as an a-phase to e-phase) exciting coils a to e disposed to surround the outer periphery of the rotor of the motor at an interval of 72 electrical degrees with a rectangular-wave current, while switching the coils sequentially phase by phase, by four-phase simultaneous exciting under the control of a control circuit of a microcomputer, etc. With the four-phase simultaneous exciting, the motor current flows through four phases of the five phases; the circuit is constructed such that the resistances of the exciting coils are equal to feed the current through the phases in good balance.

The motor driving circuits are generally constructed of ten field effect transistors (FETs). The ten transistors connect to the coil circuit of the motor such that two corresponding transistors are connected in series to construct five series transistor circuits, each of which is connected between the positive and negative terminals of the power source, and in which the connections of the two transistors of each series transistor circuit are connected to the external ends of the five star (Y)-connected exciting coils a to e.

The direction and length of the exciting current (rectangular wave) fed from the motor driving circuit to the exciting coils relative to the rotation angle (electrical angle) of the rotor is shown in FIG. 6 by way of example. Specifically, the rotor is continuously rotated by sequentially switching the exciting coils phase by phase every 36 electrical degrees and exciting each phase coil during 144 electrical degrees. Referring to FIG. 6, the sections $0° \leq \theta < 36°$, $36° \leq \theta < 72°$, $72° \leq \theta < 108°$, $108° \leq \theta < 144°$, $144° \leq \theta < 180°$, $180° \leq \theta < 216°$, $216° \leq \theta < 252°$, $252° \leq \theta < 288°$, $288° \leq \theta < 324°$, and $324° \leq \theta < 360°$ are indicated by (1) to (10), respectively, where $\theta$ is the electrical angle.

In this example, the a-phase current flows in the plus direction in sections (1) and (2), at zero in section (3), in the minus direction in sections (4) to (7), at zero in section (8), passes through sections (9) to (10), and again flows in the plus direction in section (1). The b-phase current flows in the plus direction in sections (1) to (4), at zero in section (5), in the minus direction in sections (6) to (9), at zero in section (10), and again flows in the plus direction in section (1). The c-phase current flows in the minus direction in section (1), at zero in section (2), in the plus direction in sections (3) to (6), at zero in section (7), passes through sections (8) to (10), and again flows in the minus direction in section (1). The d-phase current flows in the minus direction in sections (1) to (3), at zero in section (4), in the plus direction in sections (5) to (8), at zero in section (9) and again flows in the minus direction in section (10). The e-phase current flows at zero in section (1), in the minus direction in sections (2) to (5), at zero in section (6), in the plus direction in sections (7) to (10), and again becomes zero in section (1). Briefly, two of the five exciting coils are switched in the opposite direction at the boundaries (at the switching at every 36 electrical degrees) of the sections (1) to (10).

A brushless DC motor (BLDCM) and a permanent-magnet synchronous motor (PMSM) are known as the brushless motor. Examples of the former are disclosed in JP-A-11-356083 and JP-A-2002-269569 which adopt commutation control. An example of the latter is disclosed in JP-A-2000-201461.

Referring to FIG. 7, the brushless DC motor is lower in rpm in a low-torque load range than the permanent-magnet synchronous motor. However, it is possible to increase the rpm by weakening field control in the low-torque load range. However, this disadvantageously increases the torque ripple with an increased rpm to cause a noise due to the torque ripple.

With the permanent-magnet synchronous motor, the weakening field control facilitates the increase in rpm in the low-torque load range; however, decreases the rpm in a rated load range, being inferior to the brushless DC motor in terms of size reduction and high output of the motor in the rated load range.

The electrically driven power steering system requires a compact, high-output, low-torque-ripple, low-noise motor and controller and also high rpm during low torque loading (for example, in emergency).

The invention has been made in view of the above problems. Accordingly, it is a fourth object of the invention to provide a brushless-motor drive controller for a brushless DC motor in which high rpm is achieved and torque ripple is reduced during low torque loading.

SUMMARY OF THE INVENTION

The present invention relates to a motor including a motor-wiring bus bar, comprising: a plurality of annular ring conductors connecting lead wires of said motor or connecting said lead wires and a power line together; and a plurality of terminals attached to said ring conductors. The first object of the invention is achieved by setting said ring conductors different in diameter and arranging said ring conductors concentrically in a same plane, wherein: said motor includes a stator in which a plurality of stator cores wound with said lead wires is arranged in a circle.

It is also achieved by constructing said ring conductor from part of a annulus ring, or covering said ring conductors with insulating coating, or making that a current to said lead wires of said motor has multiple phases and color of said lead wire is the same as color of said ring conductor which is equal in phase with said lead wire.

The invention relates to a method for manufacturing a motor including a motor-wiring bus bar, characterized in that said motor comprising: a plurality of annular ring conductors connecting lead wires of said motor or connecting said lead wires and a power line together; and a plurality of terminals attached to said ring conductors. The first object of the invention is achieved by making that said motor includes a stator in which a plurality of stator cores wound with said lead wires is arranged in a circle; and said ring conductor is formed by transforming a rectangular plate into annular shape or slicing a cylinder.

The present invention relates to a permanent-magnet motor capable of achieving low cogging torque, low torque ripple, and high output with compact size and including a distributed-coil stator driven with a rectangular-wave current. The second object of the invention is achieved by a three-phase permanent-magnet motor, comprising: a distributed-coil stator, wherein: said motor is driven with a rectangular-wave current; S/2 mp=1 holds (where S is number of slots, m is number of phases of said motor, and 2p (p≧2) is number of poles); and when p is an even number, a cycle of angle width of teeth is expressed as 360/S×4 and, when p is an odd number, said cycle of angle width of teeth is expressed as 360/S×6.

The second object of the invention is advantageously achieved by making that in one of said cycle of angle width of teeth, when p is an even number, kind of angle width of teeth is set to three and, when p is an odd number, said kind of angle width of teeth is set to four; and for combination, angle widths of odd teeth are set to be equal and angle widths of even teeth are set to be different, or making that in one of said cycle of angle widths of teeth, when p is an even number, kind of angle width of teeth is set to three and, when p is an odd number, said kind of angle width of teeth is set to four; and for combination, angle widths of even teeth are set to be equal and angle widths of odd teeth are set to be different, or adopting every other pole winding (one coil for one slot) as method of winding so that voltages induced in coils are equal in phase, or making that when θ is equally spaced angle width and α is available said angle width of teeth, range of α is expressed as a ·θ≦α≦b·θ, where coefficients a and b are determined by torque constant or reduction ratio of cogging-torque.

The present invention relates to a brushless DC motor. The third object of the invention is achieved by a brushless DC motor, comprising: a rotatable rotor in which permanent magnet is fixed around outer periphery; and a stator core formed by a plurality of teeth holding coil around cylindrical inner periphery, wherein: S<G holds, where S is slot opening width between teeth and G is space length between said rotor and said stator core.

It is also achieved by limiting relationship between said slot opening width S and said space length G to αG<S, where α is determined from torque constant of said brushless DC motor or content of ripple of counter electromotive voltage (0<α<1).

The present invention relates to a brushless-motor drive controller in which high rpm is achieved and torque ripple is reduced in a low torque load range. The fourth object of the invention is achieved by a brushless-motor drive controller having a plurality of exciting phases, comprising: a exciting-phase-current-instruction-signal generator operable to generate an exciting-phase-current instruction signal for each exciting phase; and a exciting-current control means for controlling exciting current for each exciting phase by current feedback control in accordance with said exciting-phase-current instruction signal wherein: said exciting-phase-current-instruction-signal generator advances electrical angle of said exciting-phase-current instruction signal having shape other than a rectangular wave by a predetermined angle, so that compared to driving speed range during drive control of rectangular-wave exciting current, driving speed range of said brushless-motor is expanded.

The fourth object of the invention is advantageously achieved by a brushless-motor drive controller having a plurality of exciting phases, comprising: a exciting-phase-current-instruction-signal generator for generating exciting-phase-current instruction signal for each exciting phase; and a exciting-current controller operable to control an exciting current for each exciting phase by current feedback control in accordance with said exciting-phase-current instruction signal wherein: said exciting-phase-current-instruction-signal generator advances electrical angle of said exciting-phase-current instruction signal in which rates of change in exciting current of two commutation phases agree with each other during commutation by a predetermined angle to achieve weakening field.

The fourth object of the invention is advantageously achieved by a brushless-motor drive controller having a plurality of exciting phases, comprising: a exciting-phase-current-instruction-signal generator operable to generate an exciting-phase-current instruction signal for each exciting phase; and a exciting-current controller operable to control exciting current for each exciting phase by current feedback control in accordance with said exciting-phase-current instruction signal wherein: said exciting-phase-current-instruction-signal generator advances electrical angle of said exciting-phase-current instruction signal which is a trapezoidal-wave or a sine-wave by a predetermined angle to achieve weakening field.

The fourth object of the invention is advantageously achieved by a brushless-motor drive controller having a plurality of exciting phases, comprising: a exciting-phase-current-instruction-signal generator operable to generate an exciting-phase-current instruction signal for each exciting phase; and a exciting-current controller for controlling exciting current for each exciting phase by current feedback control in accordance with said exciting-phase-current instruction signal, wherein: said exciting-phase-current-instruction-signal generator generates said exciting-phase-current instruction signal including phase-angle advancing from a induced electromotive force, a output torque, and a rotation speed of said brushless motor.

The fourth object of the invention is advantageously achieved by a brushless-motor drive controller, wherein a rotation angle of rotor of said brushless motor is given by an angle estimation signal estimated from a rotor-position signal detected by a rotor-position detector, motor current, etc. or a brushless-motor drive controller, characterized in that when rotation speed of said motor exceeds a predetermined value, said controller shifts to weakening field control by phase-angle advancing.

BRIEF DESCRIPTION OF THE DRAWINGS

FIG. 5 is a structural diagram of a brushless DC motor, wherein FIG. 5(A) is a longitudinal view thereof and FIG. 5(B) is a sectional view thereof.

FIG. 9 is a diagram of an example of an assembly of motor-wiring bus bars of a motor (a second embodiment) according to the present invention, wherein FIG. 9(A) is a perspective view thereof and FIG. 9(B) is a plan view thereof.

FIG. 10 is a diagram of a motor-wiring bus bar made of a rectangular plate, wherein FIG. 10(A) shows the rectangular plate and FIG. 10(B) shows the motor-wiring bus bar.

DETAILED DESCRIPTION

Preferred embodiments of the present invention will be described hereinafter with reference to the drawings.

Figure 1:
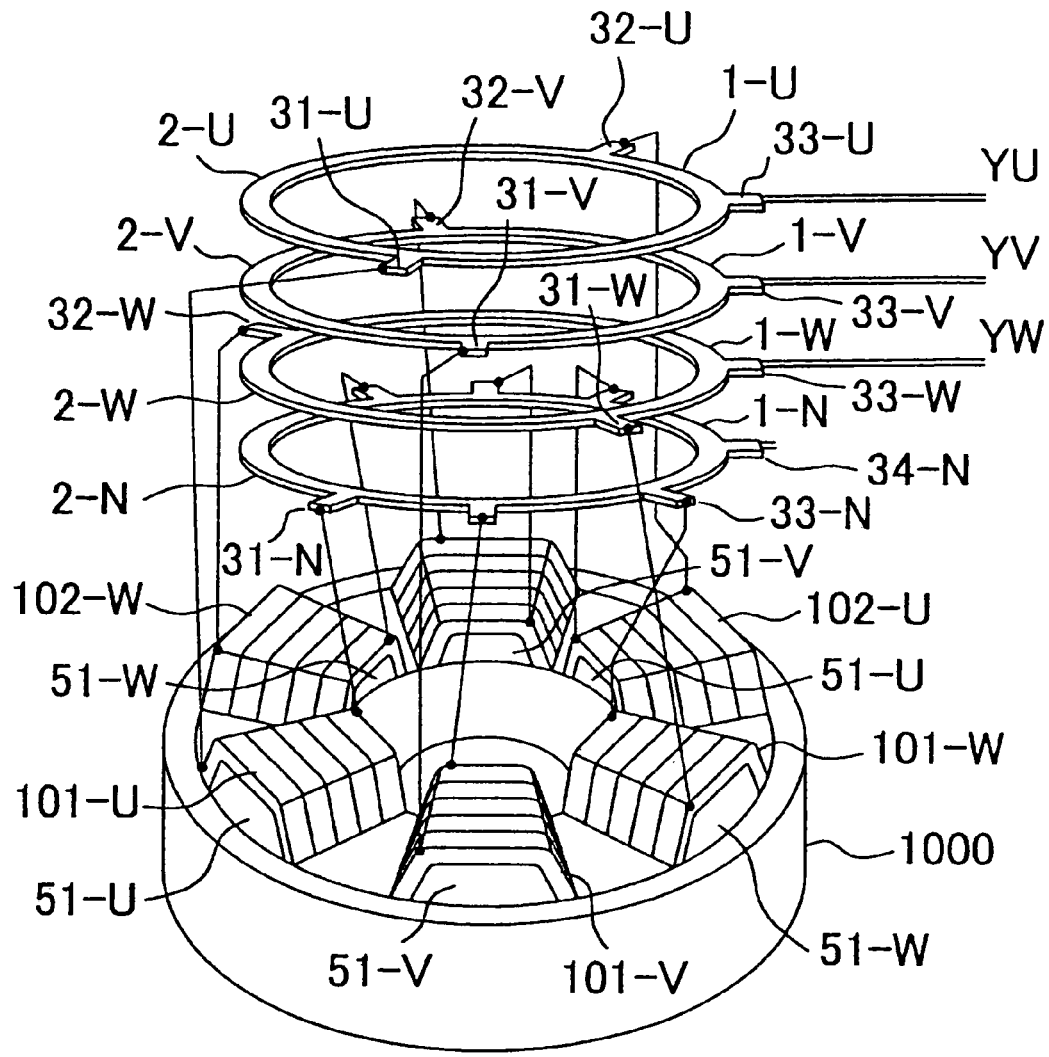
FIG. 1 is a diagram of the connection of stator core coils using motor-wiring bus bars.
Figure 2:
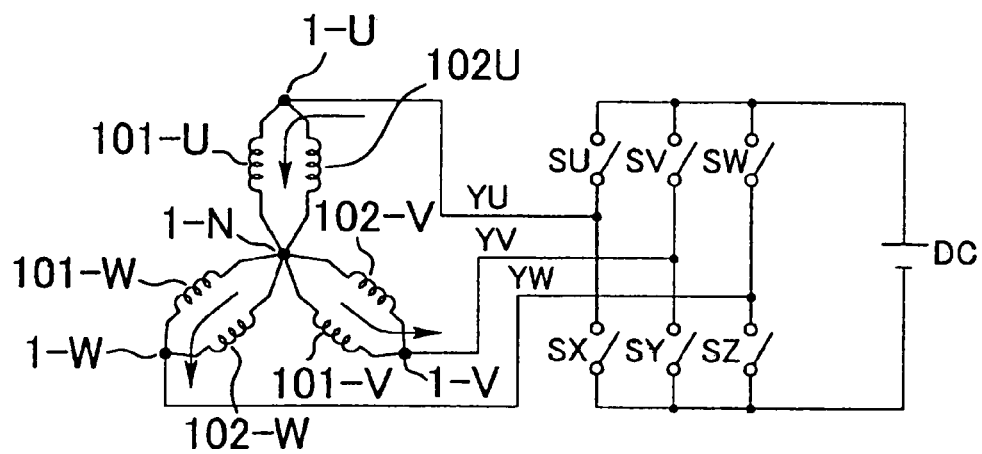
FIG. 2 is an electric circuit of motor wiring.
Figure 8:
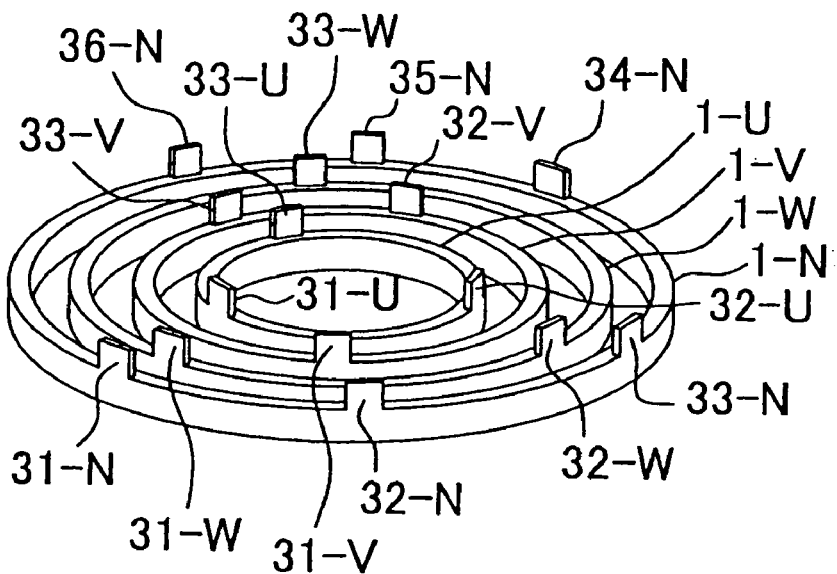
FIG. 8 is a diagram of an example of an assembly of motor-wiring bus bars of a motor (a first embodiment) according to the present invention.

Referring to FIG. 8, a first embodiment of a motor according to the invention will be described. The ring conductors 2-U, 2-V, 2-W, and 2-N are manufactured with different diameters, for example, with the ring diameter decreased in order of, e.g., U-phase, V-phase, W-phase, and N-phase, to which projecting terminals 31-U, 31-V, 31-W, 31-N and so on are mounted to the peripheries thereof; thus, the phase bus bars 1-U, 1-V, 1-W, and 1-N are completed. The bus bars 1-U, 1-V, 1-W, and 1-N are then concentrically assembled in one plane of the ring conductors. The extracting ends of the coils are extracted in correspondence with the terminal positions of the bus bars, which are connected together as shown in FIGS. 1 and 2 of the description of the background art. With the connection, the electrical connection is exactly the same as that of the background art, so that the motor can maintain the same performance as that of the background art.

Figure 3:
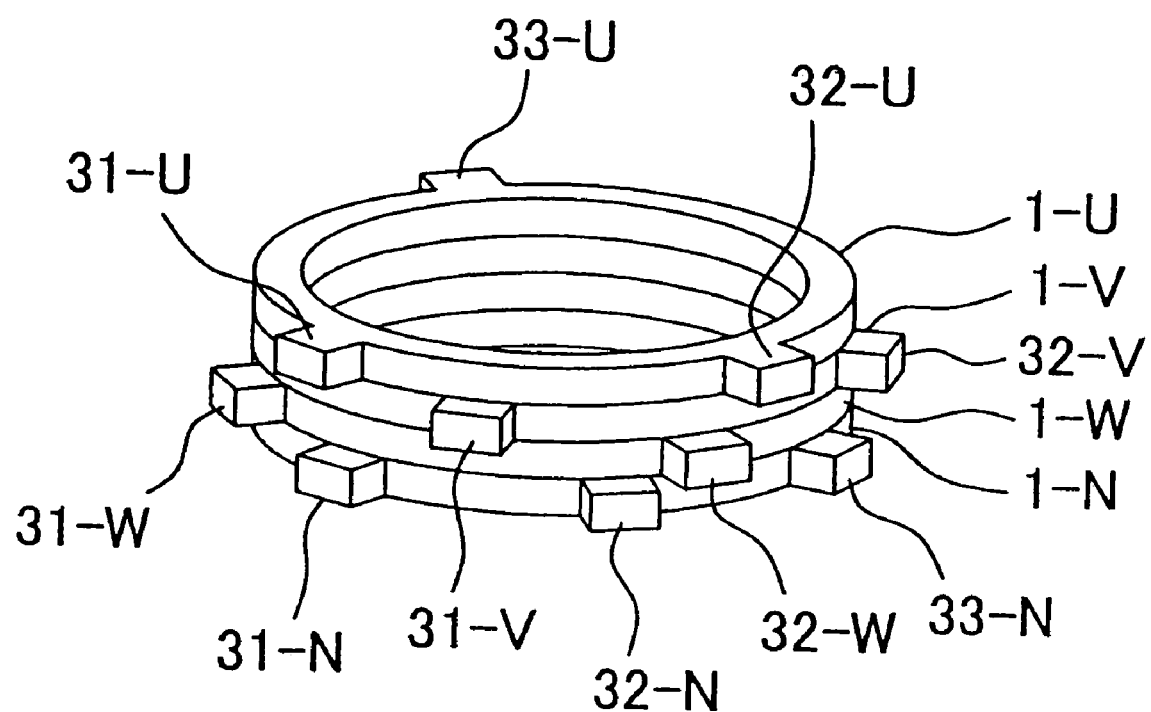
FIG. 3 is an assembly diagram of a plurality of conventional motor-wiring bus bars.
Figure 4:
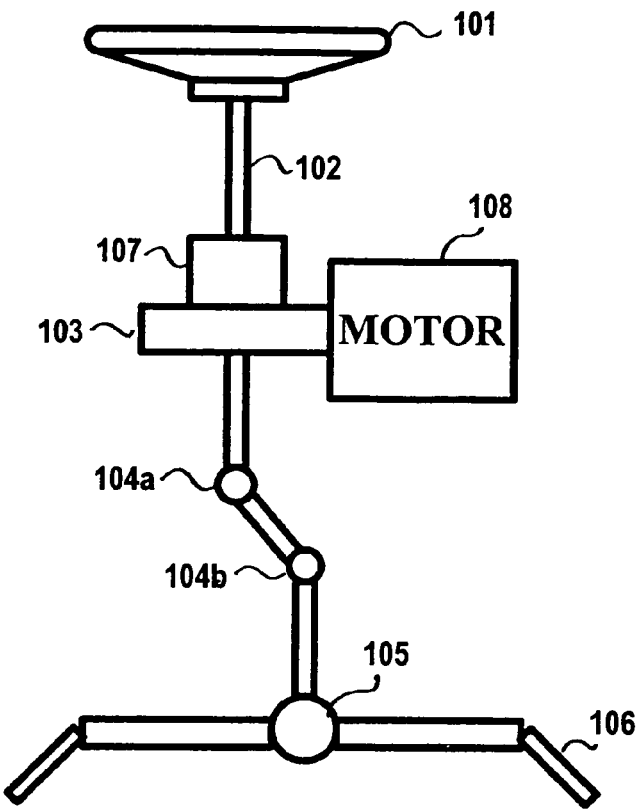
FIG. 4 is a schematic mechanism diagram of an electrically driven power steering system.

The use of the bus bars of this embodiment eliminates the necessity of stacking the bus bars, thus remarkably reducing the height. In this embodiment, the height is only a quarter of that of the conventional stacked bus bars as shown in FIG. 3, remarkably reducing the height to achieve a compact motor.

Figure 9:
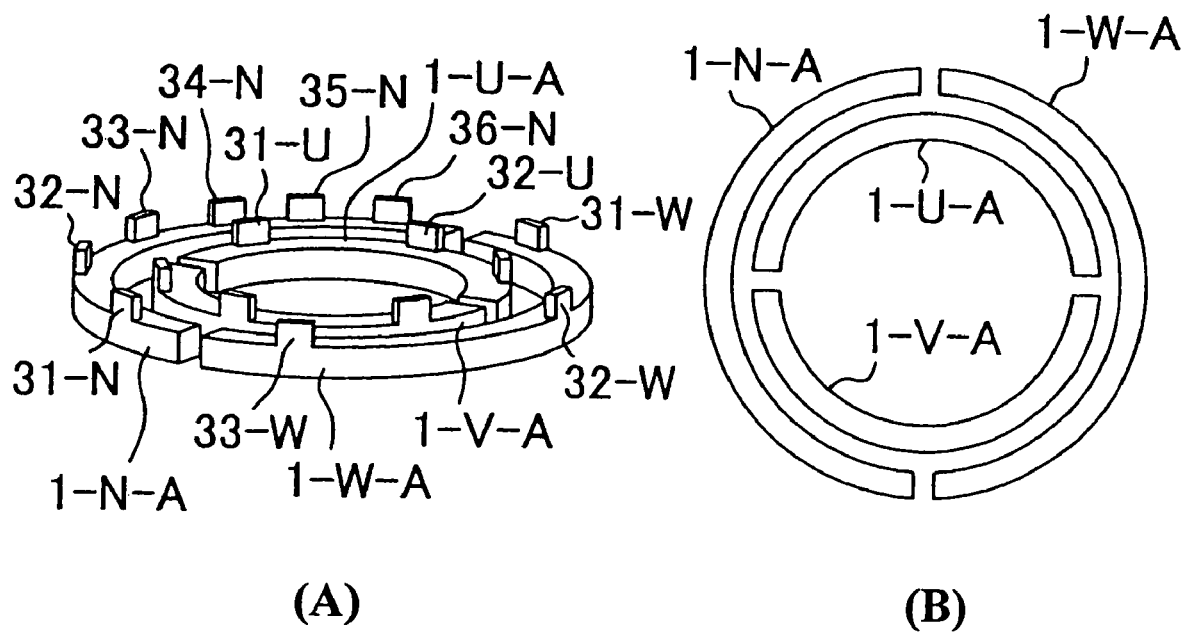

Referring now to FIG. 9, a second embodiment of a motor will be described. FIG. 9(A) shows an assembly of bus bars according to the second embodiment in perspective view. FIG. 9(B) shows the assembled bus bars in plan view. The bus bars do not necessarily require to have a perfect ring (annular) shape as electrically connecting member, even a part of ring shape functions as electrically connecting member. The bus bar is hereinafter referred to as a ring-piece bus bar. Also in this case, ring-piece bus bars 1-U-A, 1-V-A, 1-W-A, and 1-N-A are manufactured with different diameters and concentrically assembled in one plane, as in the first embodiment. With this embodiment, the coil extracting positions of the coils are limited because the ring conductors are smaller than those of the embodiment of FIG. 8. The ring-piece bus bars are therefore suitable for motors having small number of coils.

Also with this embodiment, the height of the assembled ring-piece bus bars can be smaller than that of the conventional stacked one, offering an advantage in reducing the size of motors and a great economical effect of decreasing the number of components.

The bus bar is not generally single but multiple, which are generally arranged in close vicinity, so that they may come in contact with one another. The contact would cause electrical shortage to damage the motor function. It is thus considered that an insulation space is provided or an insulator is placed therebetween, which will decrease working efficiency. Accordingly, applying an insulator to the ring conductors in advance will prevent electrical shortage even if the bas bars come in contact with one another, improving assembly efficiency and eliminating useless space to reduce the size of the motor.

An increase in the number of the stator cores increases the number of phase coils connected to the ring conductors. The increase in the number of the connected wires raises the possibility of miswiring. Thus, the color of the coil of individual phase and the ring conductor of the same phase as that of the coil are colored in the same color. For example, when the respective coils 101-U, 101-V, and 101-W of U-phase, V-phase, and W-phase are colored in red, blue, and white, respectively, and the bus bars 1-U, 1-V, 1-W, and 1-N of the U-phase, V-phase, W-phase, and N-phase are colored in red, blue, white, and green, respectively, the coils with the same phase can be connected together at a glance. More specifically, the lead wire of the red coil 101-U adjacent to the power source connects to the red bus bar 1-U, that of the blue coil 101-V connects to the blue bus bar 1-V, and that of the white coil 101-W connects to the white bus bar 1-W. The lead wires of the coils of all the phases adjacent to the neutral point connect to the green bus bar 1-N.

Accordingly, since they can be assembled without caution to miswiring, which offers advantages of increasing working efficiency and the quality of the motor because no miswired motor is manufactured. For coloring, it is sufficient to color only part of the coils and bus bars if the phases can be discriminated to prevent miswiring. When the entire ring conductors are colored, providing insulating function to the paint for coloring eliminates the possibility of electrical shortage and miswiring, thus greatly improving assembly efficiency.

The method will be described for manufacturing the motor including the motor-wiring bus bars according to the invention.

Figure 10:
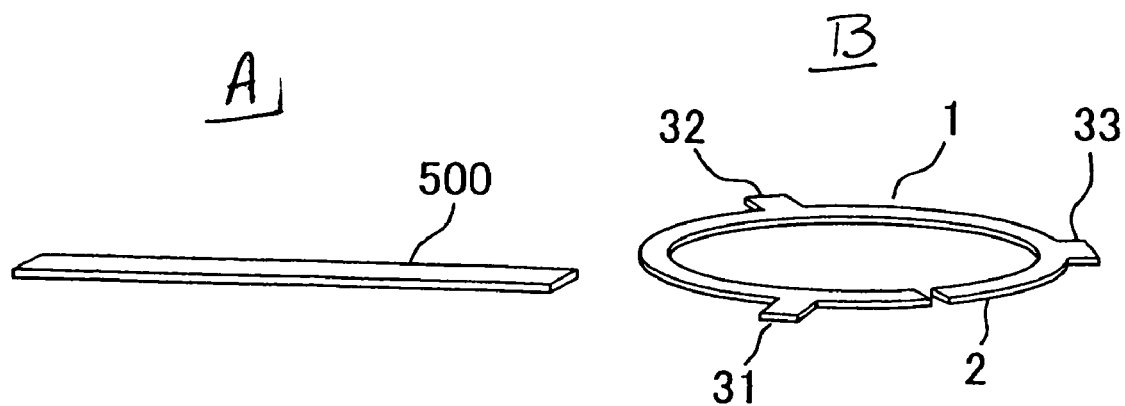
Figure 11:
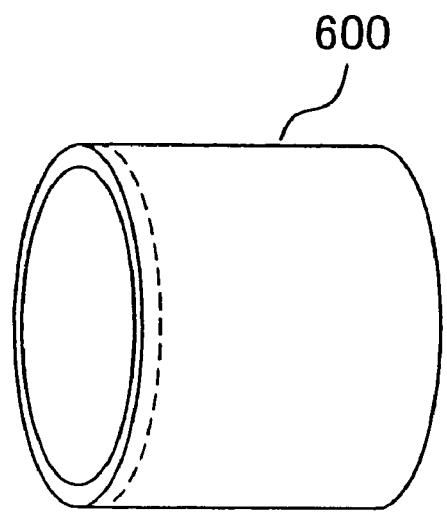
FIG. 11 is a diagram of a motor-wiring bus bar made of a cylinder, according to the present invention.

FIG. 10(A) shows a copper rectangular plate 500 serving as the material of the ring conductors, which is transformed into annular shape to form a ring conductor 2. The ring conductor 2 includes projecting terminals 31, 32, and 33 for electrically connecting to the coils 100-U and 101-U and the power line YU around the periphery to form a bus bar 1 constructed of a ring conductor and terminals, shown in FIG. 10(B). The ring conductor 2 can also be manufactured without using the rectangular plate. Referring to FIG. 11, when a copper cylinder 600 is sliced into the ring conductor 2, to which the projecting terminals 31, 32, and 33 are attached for connecting coils to the ring conductor, the bus bar 1 is completed. Also in this case, the member is not wasted, different from stamping manufacture. The thickness of the rectangular plate and the sliced cylinder is determined depending on the capacity of the current flowing through the ring conductor 2.

As described above, by the method of manufacturing the motor including the bus bar using the ring conductor made of the rectangular plate or the cylinder, according to the invention, less member is wasted, offering an economical advantage of increasing yields different from the conventional stamping manufacture of motor including the bus bar using the ring conductor.

A preferred embodiment of a permanent-magnet motor according to the invention will now be described with reference to the drawings. In this description, the angle widths of the teeth mean an angle between the centers of adjacent slot openings. Specifically, they are T1 to T12 in FIGS. 12, 13, 15 and 16 and T1 to T18 in FIGS. 17 and 14.

This invention will first be described for an embodiment applied to a permanent-magnet motor including four-pole 12-slot distributed coils. In this embodiment, since the number S of slots is 12 and the number 2p of poles is 4, p becomes 2.

Figure 15:
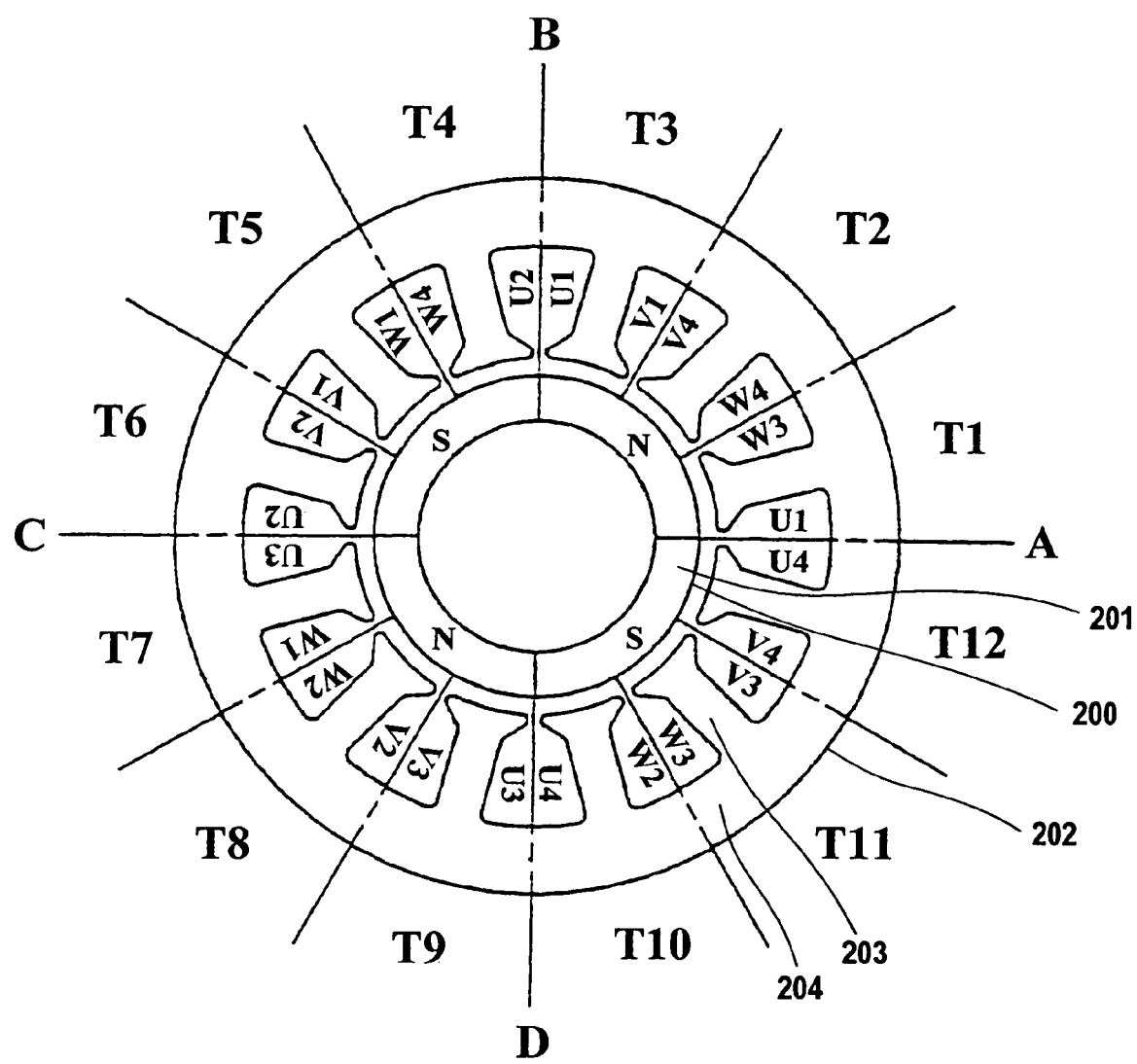
FIG. 15 is a cross-sectional view of a conventional permanent-magnet rotary electric motor including four-pole 12-slot distributed coils.

FIG. 15 shows a conventional permanent-magnet motor including four-pole 12-slot distributed coils in sectional view. As shown in FIG. 15, a ring-shaped permanent magnet 201 includes four magnetic poles at regular intervals of 90 degrees to construct a rotor 200. Twelve teeth 203 facing the permanent magnet 201 are arranged at regular intervals, winding grooves (slots) between the adjacent teeth 203 are wound with coils and the teeth 203 are held by a yoke 204 to construct a stator 202. The rotor 200 rotates around a shaft (not shown) by a rotating magnetic field generated from the current flowing through the coils of the stator 202.

Figure 16:
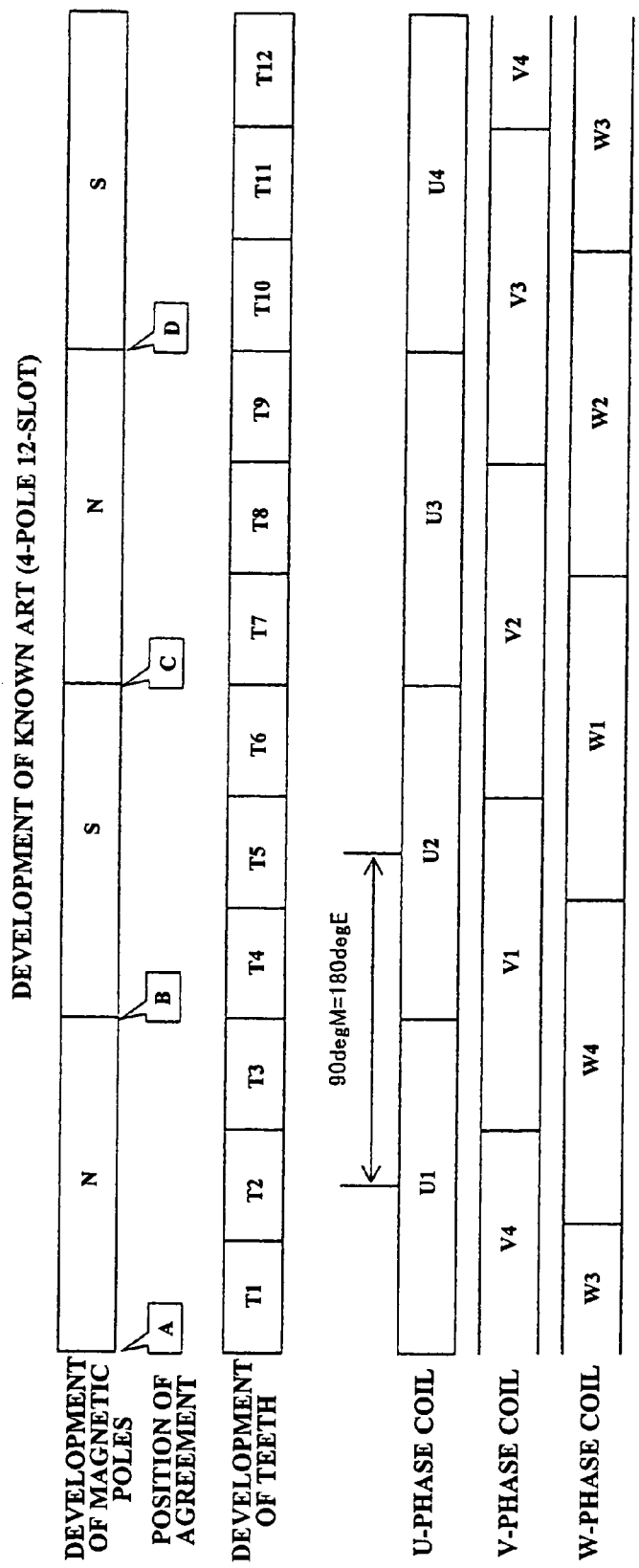
FIG. 16 is a development chart of the magnetic poles and the teeth of the conventional permanent-magnet motor of FIG. 15.

FIG. 16 shows the development of the magnetic poles and the teeth 203 of the conventional permanent-magnet motor of FIG. 15. As shown in FIG. 16, the four magnetic poles of the permanent-magnet motor are developed in order of N, S, N, and S. The 12 teeth 203 are also developed, in which the angle widths T1 to T12 for the 12 teeth 203 are equal.

As shown in FIGS. 15 and 16, the positions where the pitch of the magnetic poles (the switching between the N-pole and the S-pole) and the pitch of the teeth 203 (the angle widths of the teeth) agree with each other are four positions, A, B, C, and D, surrounded by a rectangular frame. Briefly, when the pitch of the magnetic poles is expressed in mechanical angle, four positions, 0 degree, 90 degrees, 180 degrees, and 270 degrees are given. The pitch of the teeth 203 is expressed as 12 positions of 0 degree, 30 degrees, 60 degrees, 90 degrees, 120 degrees, 150 degrees, 180 degrees, 210 degrees-240 degrees, 270 degrees, 300 degrees, and 330 degrees. In other words, for the conventional permanent-magnet motor shown in FIG. 15, all the four positions in the pitch of the magnetic poles agree with the pitch of the teeth 203 in angle.

Since the conventional permanent-magnet motor of FIG. 15 adopts adjacent-pole wiring in which two coils are wound for one slot, it includes four coils for each phase. Specifically, the U-phase winding is constructed of four coils, U1, U2, U3, and U4, the V-phase winding is constructed of four coils, V1, V2, V3, and V4, and the W-phase winding is constructed of four coils, W1, W2, W3, and W4. FIG. 15 clearly shows that two coils are wound for one slot.

Cogging torque generates by the change in magnetic energy. In other words, the more the positions where the pitch of the magnetic poles and the pitch of the teeth agree to each other, the more the phases of the change in magnetic energy agree to each other, so that the change in magnetic energy increases, thus increasing the cogging torque. Thus, the conventional permanent-magnet motor shown in FIGS. 15 and 16 has as many as four positions where the pitch of the magnetic poles and the pitch of the teeth agree to each other, posing the problem of increasing the cogging torque.

Figure 12:
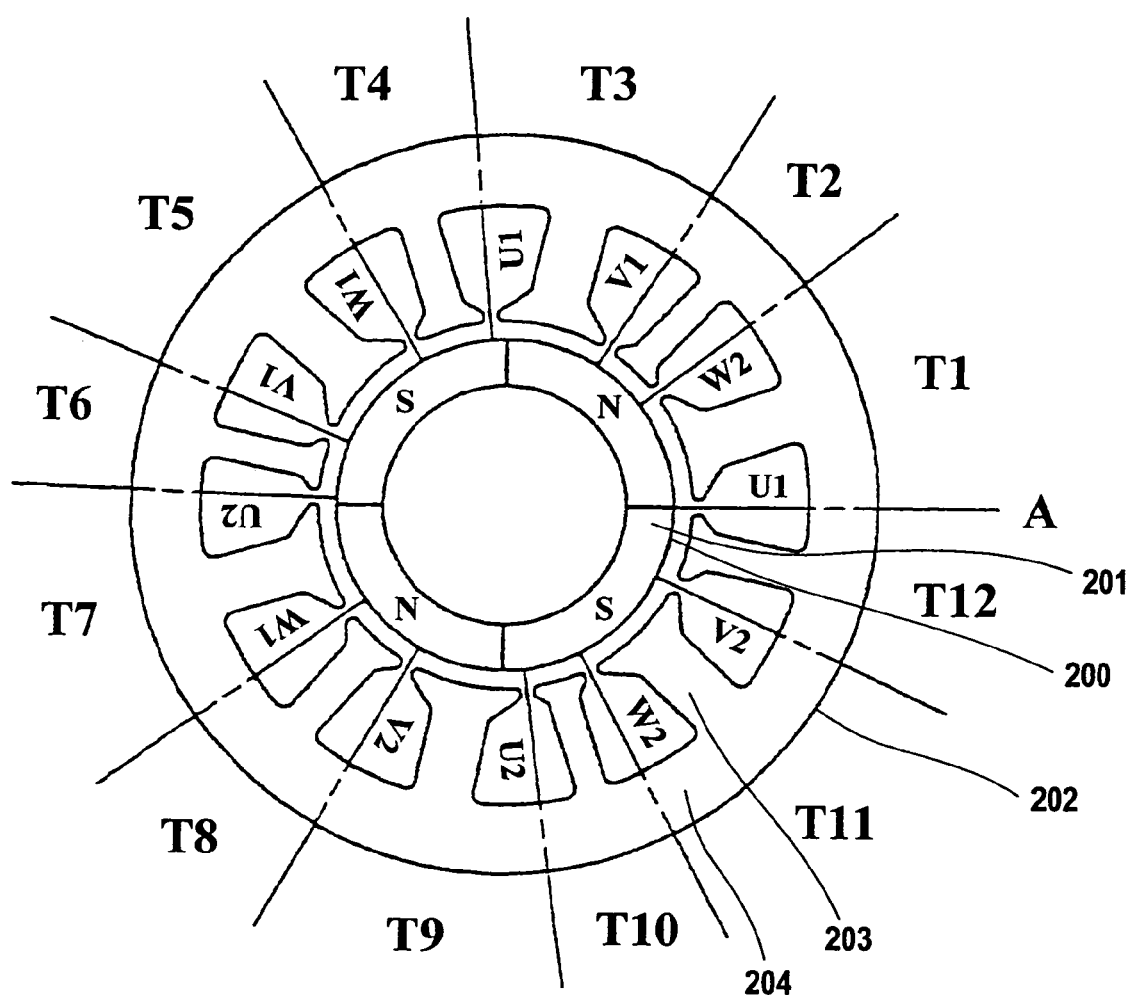
FIG. 12 is a cross-sectional view of a permanent-magnet motor (first embodiment) including four-pole 12-slot distributed coils, according to the present invention.

FIG. 12 shows a sectional view of the permanent-magnet motor including four-pole 12-slot distributed coils (a first embodiment), according to the invention. As shown in FIG. 12, a ring-shaped permanent magnet 201 includes four magnetic poles at regular intervals of 90 degrees to construct a rotor 200. Twelve teeth 203 facing the permanent magnet 201 are held in a yoke 204 to construct a stator 202, winding grooves (slots) between the adjacent teeth 203 are wound with coils. The rotor 200 rotates around a shaft (not shown) by a rotating magnetic field generated from the current flowing through the coils of the stator 202.

Figure 13:
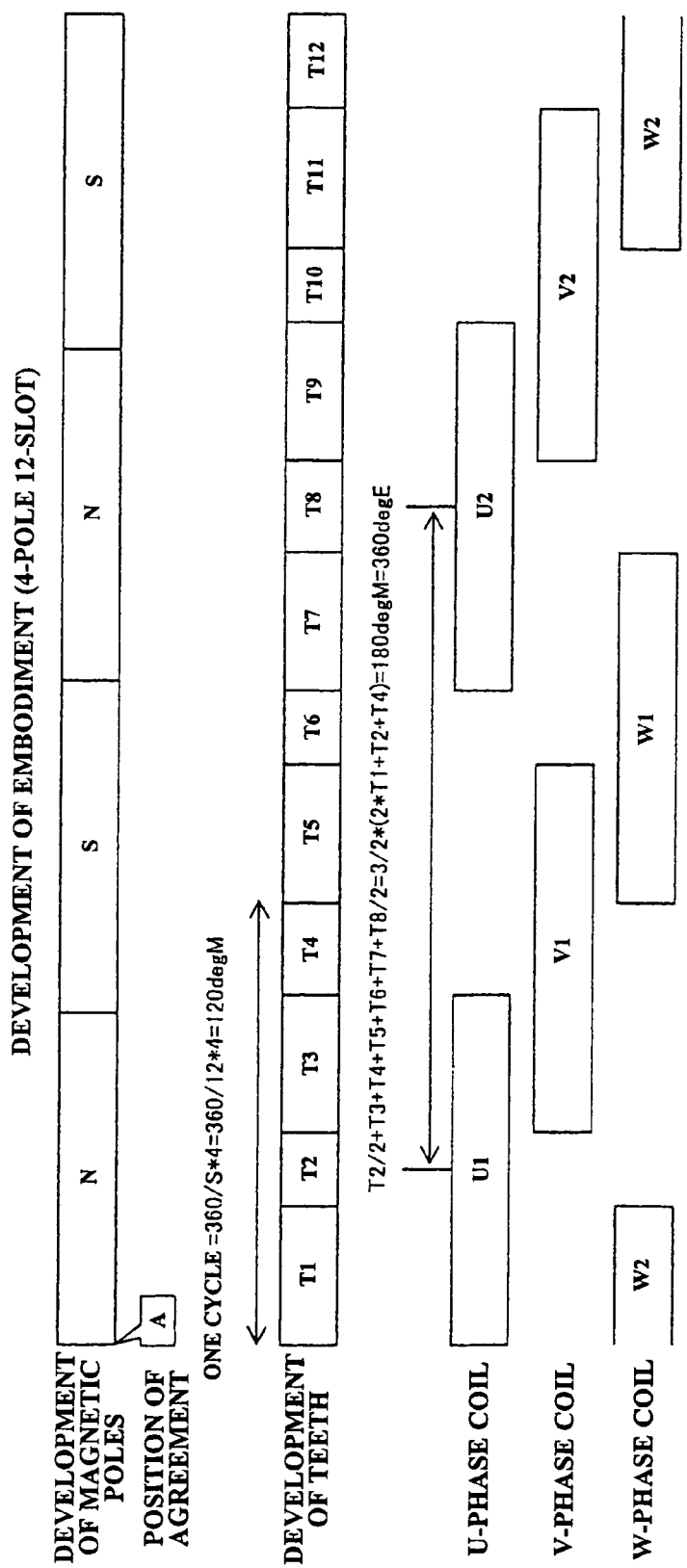
FIG. 13 is a development chart of the magnetic poles and the teeth of the permanent-magnet motor of FIG. 12.

FIG. 13 shows the development of the magnetic poles and the teeth 203 of the permanent-magnet motor of FIG. 12. As shown in FIG. 13, the permanent-magnet motor of the invention includes four magnetic poles, which are developed in order of N, S, N, and S. The 12 teeth 203 are also developed. The angle widths of the 12 teeth 203 have a cycle. The cycle of the angle widths of the teeth 203 is expressed as equations (2) and (3).

when p is an even number, $$\text{the cycle of the angle width of the teeth} = 360/S \times 4 \quad (2)$$

and when p is an odd number, $$\text{the cycle of the angle width of the teeth} = 360/S \times 6 \quad (3)$$

where S is the number of slots and 2p is the number of poles.

Accordingly, in this embodiment, 360/12×4=120 holds, so that the cycle of the angle widths of the teeth 203 is 120 degrees. Specifically, this embodiment has a total of three cycles: the angle widths of the teeth, T1, T2, T3, and T4, construct one cycle, the angle widths of the teeth, T5, T6, T7, and T8, construct another cycle, and the angle widths of the teeth, T9, T10, T11, and T12, construct still another cycle.

In short, with the permanent-magnet motor including four-pole 12-slot distributed coils (the first embodiment) according to the invention, since the cycle of the angle widths of the teeth is 120 degrees, the phase deviates from the pitch of the magnetic poles, 90 degrees. This allows the cogging frequency higher to thereby reducing the cogging torque.

In the permanent-magnet motor including four-pole 12-slot distributed coils according to the invention, shown in FIG. 12, the kind of the angle widths of the teeth is set to three when p is an even number, while it is set to four when p is an odd number in the cycle of the angle width of one tooth (the kind of the angle widths of the teeth is three in this embodiment). For the combination, the angle widths of the odd teeth are set to be equal and the angle widths of the even teeth are set to be different.

Specificallly, referring to the development plan of FIG. 13, T1=T3 and T2≠T4 hold in the cycle of teeth angle widths, T1, T2, T3, and T4, while T5=T7 and T6≠T8 hold in the cycle of teeth angle widths, T5, T6, T7, and T8. Also T9=T11 and T10≠T12 hold in the cycle of teeth angle widths, T9, T10, T11, and T12. Of course, T1=T3=T5=T7=T9=T11, T2=T6=T10, and T4=T8=T12 hold.

As shown in the development plan of FIG. 13, for example, the phase difference between the coils U1 and U2 is expressed as equation (4)

$$\text{phase difference } (U1, U2) = T2/2 + T3 + T4 + T5 + T6 + T7 + T8/2 \quad (4)$$

$$= 3/2 \times (2 \times T1 + T2 + T4) = 180 \text{ degrees}$$

Since a phase difference of 360 electrical degrees is given from the equation (4), the voltages induced in the coils U1 and U2 are equal in phase.

In the permanent-magnet motor including four-pole 12-slot distributed coils according to the invention, shown in FIG. 12, setting T1>T2 and T1>T4 increases the flux linkage of the coils, thus offering the advantage of increasing the torque constant. As shown in the development plan of FIG. 13, the position where the pitch of the magnetic poles (the switching of N-pole and S-pole) and the pitch of the teeth (angle widths of the teeth) agree with each other is only one, point A surrounded by the rectangular frame.

Since the permanent-magnet motor including four-pole 12-slot distributed coils according to the invention, shown in FIG. 12, adopts every-other-pole wiring in which one coil is wound for one slot, it includes two coils for each phase. Specifically, the U-phase winding is constructed of two coils, U1 and U2, the V-phase winding is constructed of two coils, V1 and V2, and the W-phase winding is constructed of two coils, W1 and W2. FIG. 12 clearly shows that one coil is wound for one slot.

As described above, since the permanent-magnet motor including distributed coils according to the invention adopts the combination of the angle widths of the teeth and the every-other-pole distributed winding (one coil for one slot), the phases of the voltage induced in the coils do not deviate, thus not increasing torque ripple. In the permanent-magnet motor including distributed coils according to the invention, the range of the available angle width α of the tooth is expressed in terms of the angle width θ at equal intervals as the expression (5)

$$a \cdot \theta \leq \alpha \leq b \cdot \theta \quad (5)$$

where a and b are coefficients determined depending on the torque constant or the reduction ratio of the cogging-torque.

While the permanent-magnet motor including four-pole 12-slot distributed coils (the first embodiment) has been described in the above description, a permanent-magnet motor including six-pole 18-slot distributed coils (a second embodiment) will now be described.

Figure 17:
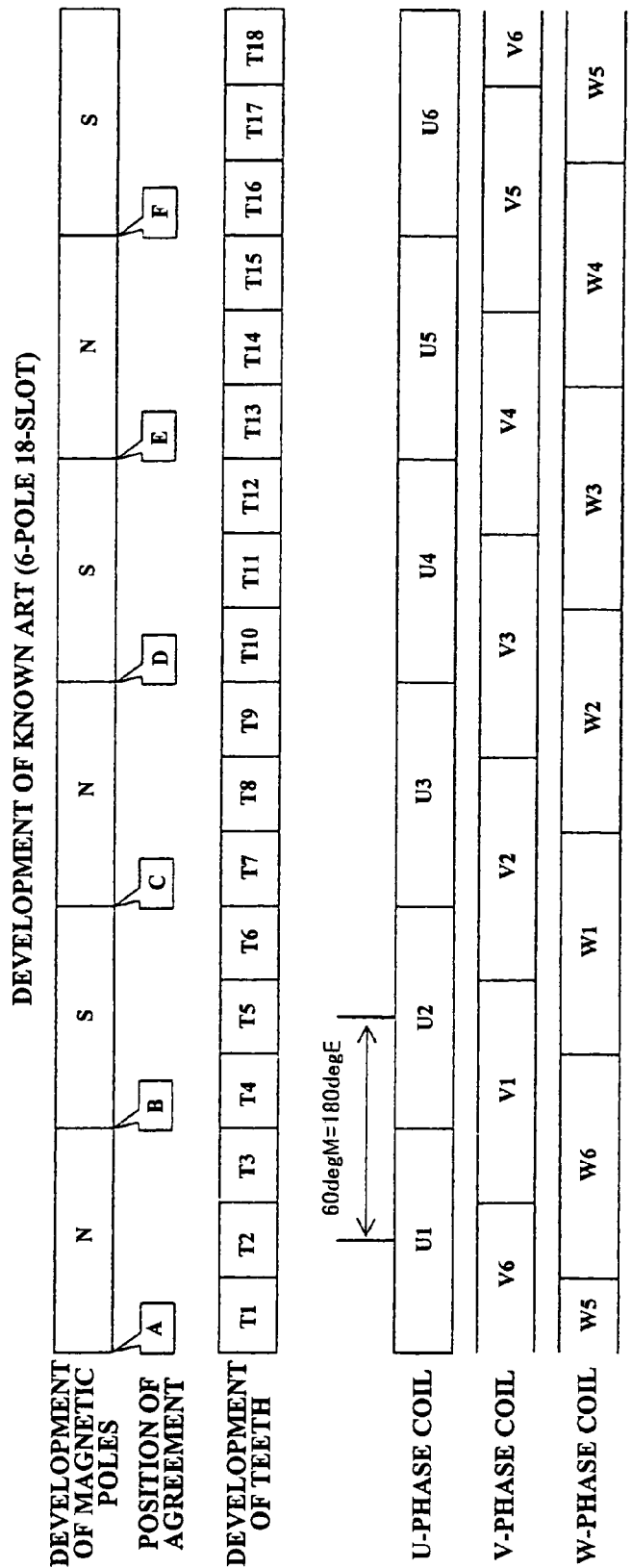
FIG. 17 is a development chart of the magnetic poles and the teeth of a conventional permanent-magnet motor including six-pole 18-slot distributed coils.

FIG. 17 shows the development of the magnetic poles and the teeth of a conventional permanent-magnet motor including six-pole 18-slot distributed coils. As shown in FIG. 17, the six magnetic poles of the conventional permanent-magnet motor are developed in order of N, S, N, S, N, and S. Eighteen teeth are also developed, in which all the angle widths T1 to T18 for the 18 teeth are equal.

As shown in FIG. 17, the positions where the pitch of the magnetic poles (the switching between the N-pole and the S-pole) and the pitch of the teeth (the angle widths of the teeth) agree with each other are six positions, A, B, C, D, E, and F, surrounded by a rectangular frame. Briefly, when the pitch of the magnetic poles is expressed in mechanical angle, six positions of 0 degree, 60 degrees, 120 degrees, 180 degrees, 240 degrees, and 300 degrees are given. The pitch of the teeth is expressed as 18 positions of 0 degree, 20 degrees, 40 degrees, 60 degrees, 80 degrees, 100 degrees, 120 degrees, 140 degrees, 160 degrees, 180 degrees, 200 degrees, 220 degrees, 240 degrees, 260 degrees, 280 degrees, 300 degrees, 320 degrees, and 340 degrees. In other words, with the conventional permanent-magnet motor including six-pole 18-slot distributed coils, all the six positions of the pitch of the magnetic poles and the pitch of the teeth agree with each other in angle.

Since the conventional permanent-magnet motor including six-pole 18-slot distributed coils adopts adjacent-pole wiring in which two coils are wound for one slot, it includes six coils for each phase. Specifically, the U-phase winding is constructed of six coils, U1, U2, U3, U4, U5, and U6, the V-phase winding is constructed of six coils, V1, V2, V3, V4, V5, and V6, and the W-phase winding is constructed of six coils, W1, W2, W3, W4, W5, and W6. For example, since the phase difference between the coils U1 and U2 is 60 degM (mechanical angle), i.e. 180 degE (electrical angle), reversing the winding direction brings that the voltages induced in the coils become equal in phase.

Figure 14:
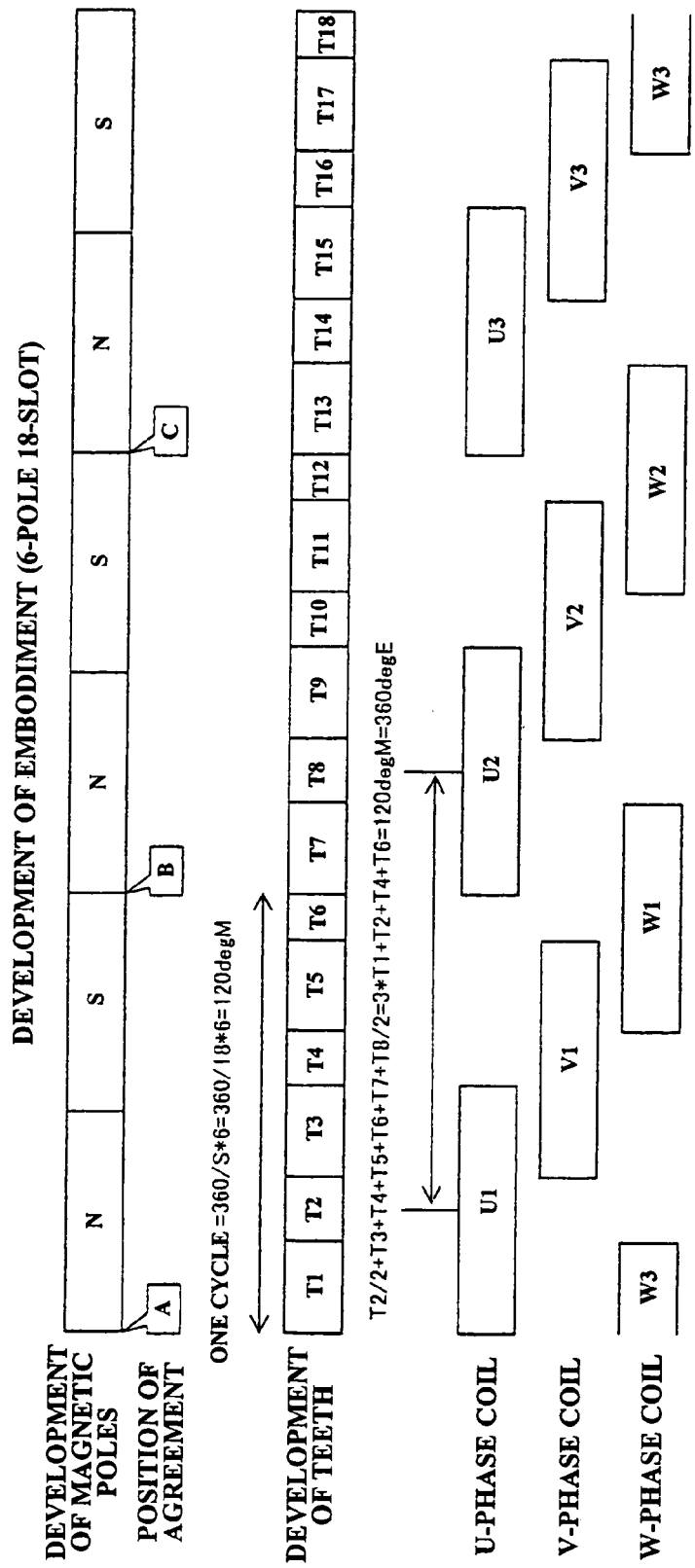
FIG. 14 is a development chart of the magnetic poles and the teeth of a permanent-magnet motor (a second embodiment) including six-pole 18-slot distributed coils, according to the present invention.

FIG. 14 shows the development of the magnetic poles and the teeth of the permanent-magnet motor including six-pole 18-slot distributed coils according to the invention. In this embodiment, since the number S of slots is 18 and the number 2p of poles is 6, p becomes 3. As shown in FIG. 14, the six magnetic poles of the permanent-magnet motor are developed in order of N, S, N, S, N, and S. The 18 teeth are also developed. In the invention, the cycle of the angle widths of the 18 teeth is expressed as equations (6) and (7).

when p is an even number, $$\text{the cycle of the angle width of the teeth} = 360/S \times 4 \quad (6)$$

and when p is an odd number, $$\text{the cycle of the angle width of the teeth} = 360/S \times 6 \quad (7)$$

where S is the number of slots and 2p is the number of poles.

Accordingly, in this embodiment, 360/18×6=120 holds, so that the cycle of the angle widths of the teeth is 120 degrees. Specifically, this embodiment has a total of three cycles: the angle widths of the teeth, T1, T2, T3, T4, T5, and T6 construct one cycle, the angle widths of the teeth, T7, T8, T9, T10, T11, and T12 construct another cycle, and the angle widths of the teeth, T13, T14, T15, T16, T17, and T18 construct still another cycle. In short, with the permanent-magnet motor including six-pole 18-slot distributed coils according to the invention, since the cycle of the angle width of the teeth is 120 degrees, the phase deviates from the pitch of the magnetic poles, 60 degrees. This allows the cogging frequency higher, thereby reducing cogging torque.

In the permanent-magnet motor including six-pole 18-slot distributed coils according to the invention, in the cycle of the angle width of one tooth, when p is an even number, the kind of the angle width of the teeth is set to three, while when p is an odd number, it is set to four (the kind of the angle widths of the teeth is four in this embodiment); for the combination, the angle widths of odd teeth are set to be equal and the angle widths of even teeth are set to be different.

Specifically, as shown in FIG. 14, T1=T3=T5 and T2≠T4≠T6 hold in the cycle of teeth angle widths, T1, T2, T3, T4, T5, and T6, while T7=T9=T11 and T8≠T10≠T12 hold in the cycle of teeth angle widths, T7, T8, T9, T10, T11, and T12. Also T13=T15=T17 and T14≠T16≠T18 hold in the cycle of teeth angle widths, T13, T14, T15, T16, T17, and T18. Of course, T1=T3=T5=T7=T9=T11=T13=T15=T17, T2=T8=T14, T4 T10=T16, and T6=T12=T18 hold.

The positions where the pitch of the magnetic poles (the switching between the N-pole and the S-pole) and the pitch of the teeth (the angle widths of the teeth) agree with each other are three positions, A, B, and C, surrounded by a rectangular frame.

As shown in the development plan of FIG. 14, for example, the phase difference between the coils U1 and U2 is expressed as equation (8).

$$\begin{aligned}\text{phase difference } (U1, U2) &= T2/2 + T3 + T4 + T5 + T6 + T7 + T8/2 \quad (8)\\ &= 3 \times T1 + T2 + T4 + T6 = 120 \text{ degM}\\ &\text{(mechanical angle)}\\ &= 360 \text{ degE (electrical angle)}\end{aligned}$$

From the equation (8), the voltages induced in the coils are equal in phase.

Since the permanent-magnet motor including six-pole 18-slot distributed coils according to the invention adopts every-other-pole wiring in which one coil is wound for one slot, it includes three coils for each phase. Specifically, the U-phase winding is constructed of three coils, U1, U2, and U3, the V-phase winding is constructed of three coils, V1, V2, and V3, and the W-phase winding is constructed of three coils, W1, W2, and W3.

While the permanent-magnet motor including four-pole 12-slot distributed coils (the first embodiment) and the permanent-magnet motor including six-pole 18-slot distributed coils (the second embodiment) have been described in the above, the invention is not limited to those but may be applied to a three-phase permanent-magnet motor driven with a rectangular-wave current and including a distributed-coil stator, in which the equation S/2 mp=1 (p≧2) holds. For the combination of the kinds of the angle widths of the teeth (three kinds when p is an even number and four kinds when p is an odd number), the angle widths of even teeth may be set to be equal and the angle widths of odd teeth may be set to be different.

A brushless DC motor according to the invention will now be specifically described with reference to the drawings.

Figure 5:
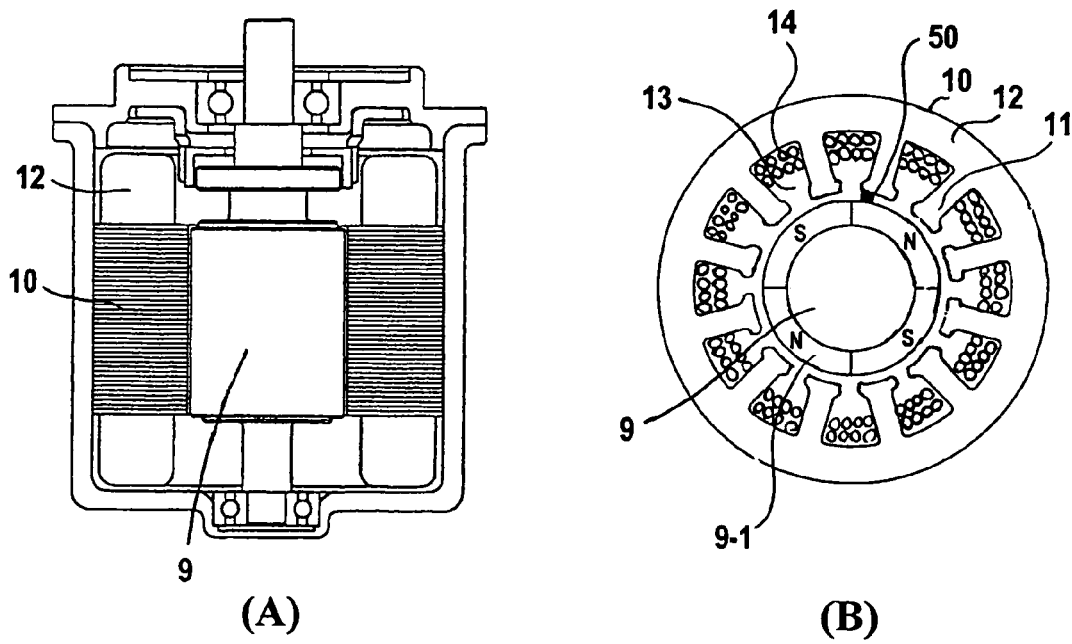
Figure 6:
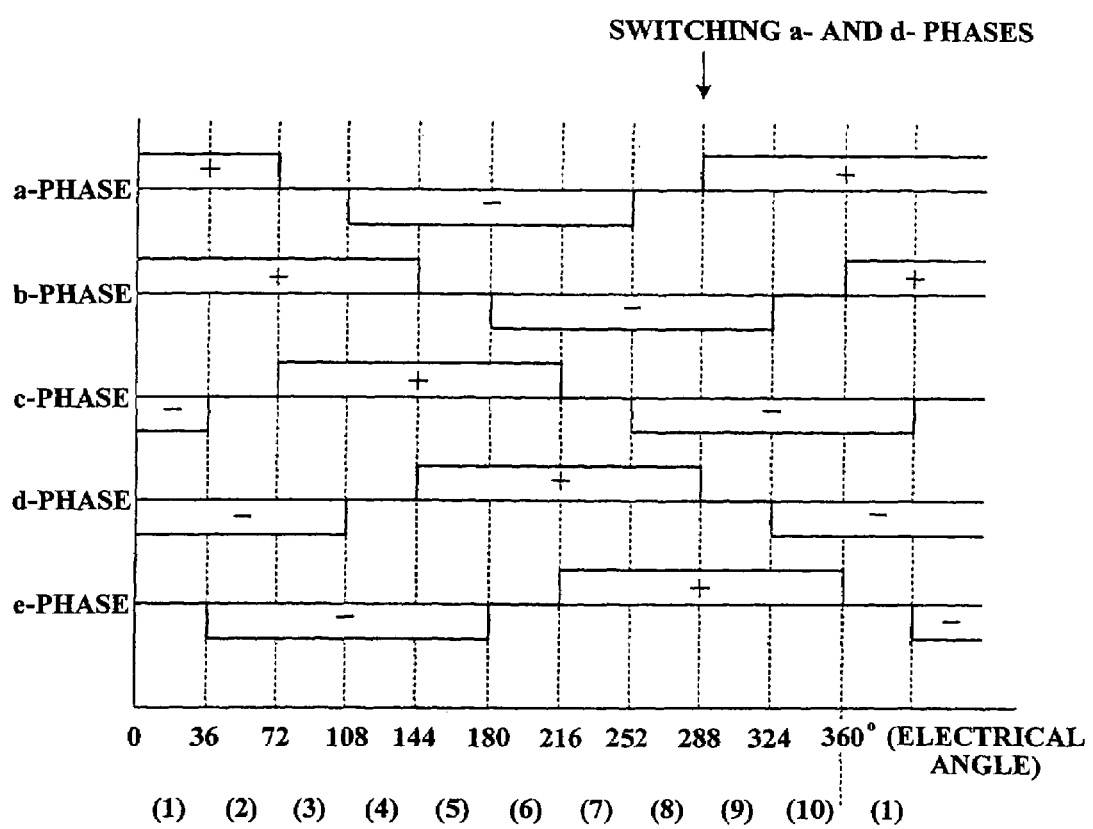
FIG. 6 is a wave-form chart of an example of an exciting current in various exciting phases of a five-phase brushless motor.
Figure 7:
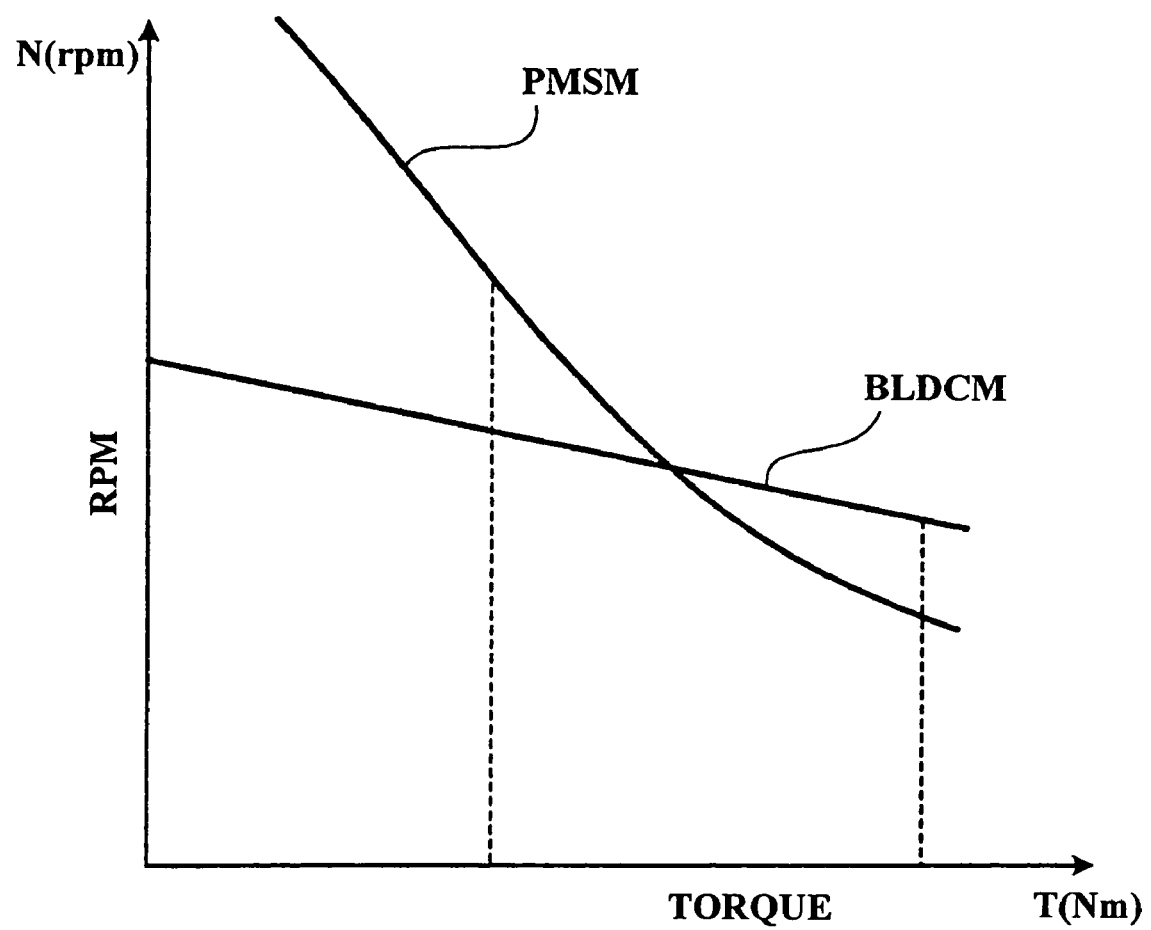
FIG. 7 is a graph of the relationship between the rpm and the torque in comparison between a conventional brushless DC motor (BLDCM) and a permanent-magnet synchronous motor (PMSM).
Figure 18:
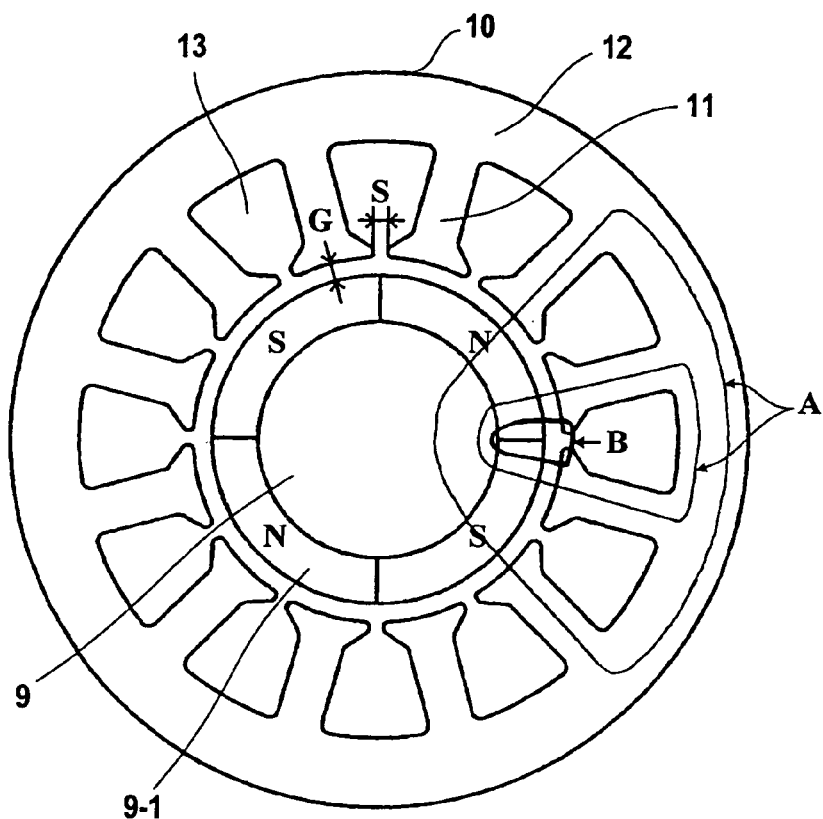
FIG. 18 is a sectional view of a rotor and a stator core of a brushless DC motor according to an embodiment of the present invention.

A first embodiment of the brushless DC motor will be described. FIG. 18 shows the brushless DC motor of the invention in cross section, which includes the same components as those of the known art of FIG. 5(B). An important point in FIG. 18 is not the components but their dimensional relationship. Specifically, the opening width S of the slot 13 i.e. the opening width S between the teeth 11, is smaller than the space length G between the rotor 9 and the stator core 10. Briefly, it is that the relationship S<G holds. When the relationship holds, the foreign matter 50, such as varnish for hardening the coils 14, does not enter from the slots 13 through the openings between the teeth 11 (the opening width S) into the space between the rotor 9 (the permanent magnet 9-1 in the strict sense) and the teeth 11 to lock the rotation of the rotor 9. This is because the size of the foreign matter 50 passing through the openings between the teeth 11 (the opening width S) is, of course, smaller than the opening width S, whereas the space length G between the rotor 9 and the teeth 11 is larger than the opening width S, so that the size of the foreign matter 50 is naturally smaller than the space length G. Thus, the foreign matter 50 is not caught in the space to lock the rotation of the rotor 9.

In general, the smaller the space length G of motors, the more effective magnetic flux is. From this point of view, the smaller the space length G the better; but actually, the space length G is of the order of one to three percent of the outside diameter of the rotor because of the mechanical structure limitation. Assuming a brushless DC motor with an output of 200 W to 800 W by way of specific example, the rotor has an outside diameter of approximately 30 to 60 mm and a space length G of 0.3 to 1.8 mm. The space length G, however, is desirably 0.6 mm or more in consideration of the reinforcement of the field magnet from the point of view of reliability. Specifically, the space length G takes on the above value; however, when the opening width S is smaller than the space length G (S<G), the rotor is not locked with the foreign matter discharged from the slot. Accordingly, this offers the advantages of preventing the brushless DC motor of an electrically driven power steering system from being suddenly locked not to ensure safety.

Figure 19:
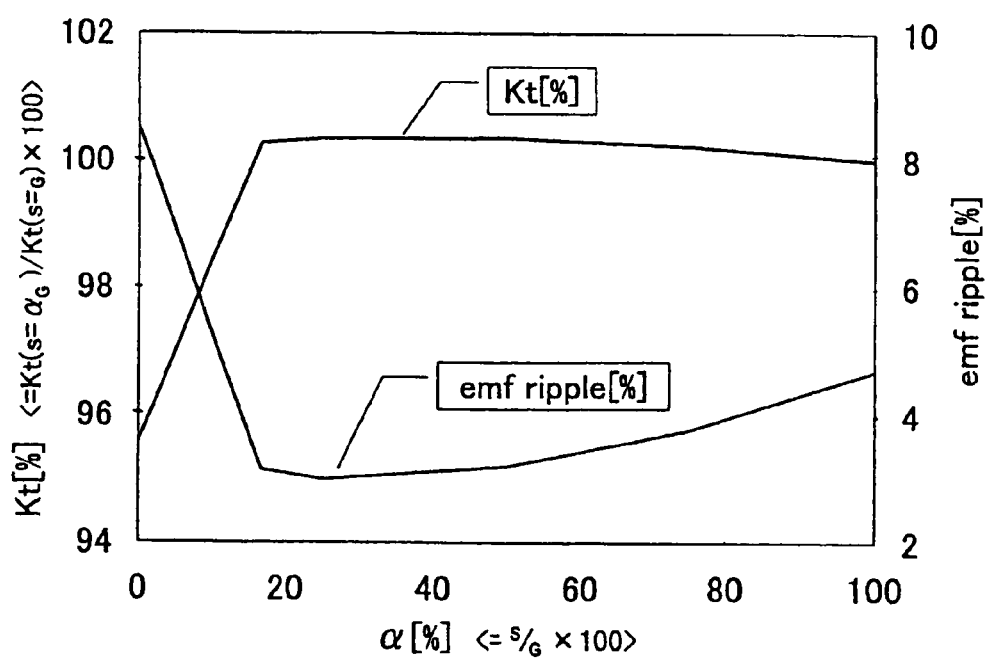
FIG. 19 is a graph of the relationship among the slot opening length S, the torque constant, and the ripple of the counter electromotive voltage of a brushless DC motor according to an embodiment of the present invention.

A second embodiment of the brushless DC motor will then be described. Too small slot opening width S decreases the torque constant of the brushless DC motor in relation to leakage flux to reduce the output and rapidly increases the ripple of the counter electromotive voltage to lower the operability of the steering. Thus, lower limit of slot opening width S must be determined. FIG. 19 shows a graph of the change in torque constant (expressed as Kt in FIG. 19) of the brushless DC motor and the ripple of the counter electromotive voltage generated in the coils (expressed as emf ripple in FIG. 19) by computer simulation when the slot opening width S in certain shape is varied from zero to the space length G. When the slot opening width S is decreased, i.e. the space between the teeth 11 is decreased, an inflection point at which the torque constant rapidly decreases, or the content of the ripple rapidly increases appears near the point at which the opening width S is 20 percent of the space length G. This is because, referring to FIG. 18, although the magnetic flux normally passes through the magnetic path indicated by A, a leakage flux circuit where the magnetic flux passes through the magnetic path indicated by B generates with a reduced opening width between the teeth 11, so that the effective magnetic flux in the magnetic path A decreases. The leakage flux passing through the magnetic path B also becomes a contributing factor that decreases the torque constant and increases the ripple of the counter electromotive voltage. When the opening width S becomes smaller than αG, where α is the coefficient and G is the space length, the ripple of the counter electromotive voltage rapidly increases.

The means for determining the coefficient α is determined by electromagnetic field simulation in consideration of the structure. This is because the ratio of the quantity of the magnetic flux passing through the magnetic path A to the quantities of the magnetic flux passing through the magnetic path B has a correlation. Specifically, the ratio of the amounts of magnetic flux passing through the magnetic paths A and B is determined depending on complicated factors including the ratio of the magnetic permeability determined depending on the material of the stator core 12 to the magnetic permeability of air, the shape, namely, the shape of the stator core 12 and the shape of the teeth 11, and the degrees of the projections of the corners of the teeth 11. It is therefore impossible to determine the ratio of the quantities of magnetic flux in the magnetic paths by a simple expression; in practice, it is determined by computer simulation in consideration of the material and structure of the stator core 12 and magnetic flux density. The value of the coefficient α is thus determined by computer simulation. One example of the actual simulation is shown in FIG. 19, described above. In this case, when the opening width S becomes approximately 20 percent of the space length G, the ripple of the counter electromotive voltage rapidly increases to significantly lower the operability of the electrically driven steering. With this embodiment, therefore, when the opening width S is set to 20 percent or more of the space length G, the torque constant does not decrease, the ripple of the counter electromotive voltage is brought within the allowable range, so that it is expected that the operability of the electrically driven steering is not lowered.

The invention has the advantages of eliminating a decrease in output due to a decrease in torque constant and also the problem of decreasing the operability of the steering because of increased torque ripple and preventing the motor lock of the brushless DC motor, different from the method of the known art in which a divided core is adopted, and in which the inner peripheries of the adjacent teeth are joined together. Since molding is not adopted in the invention, the motor lock of the brushless DC motor can be prevented at low cost.

A preferred embodiment of a brushless-motor drive controller according to the invention will now be specifically described. Although the embodiment is described with an application to a three-phase brushless DC motor by way of example, the invention is not limited to that but may be applied to another multiple-exciting-phase (for example, five-phase) brushless motor. An exciting-phase-current instruction signal may be produced by either hardware or software. In this embodiment, the exciting-phase-current instruction signal is produced by software.

Figure 20:
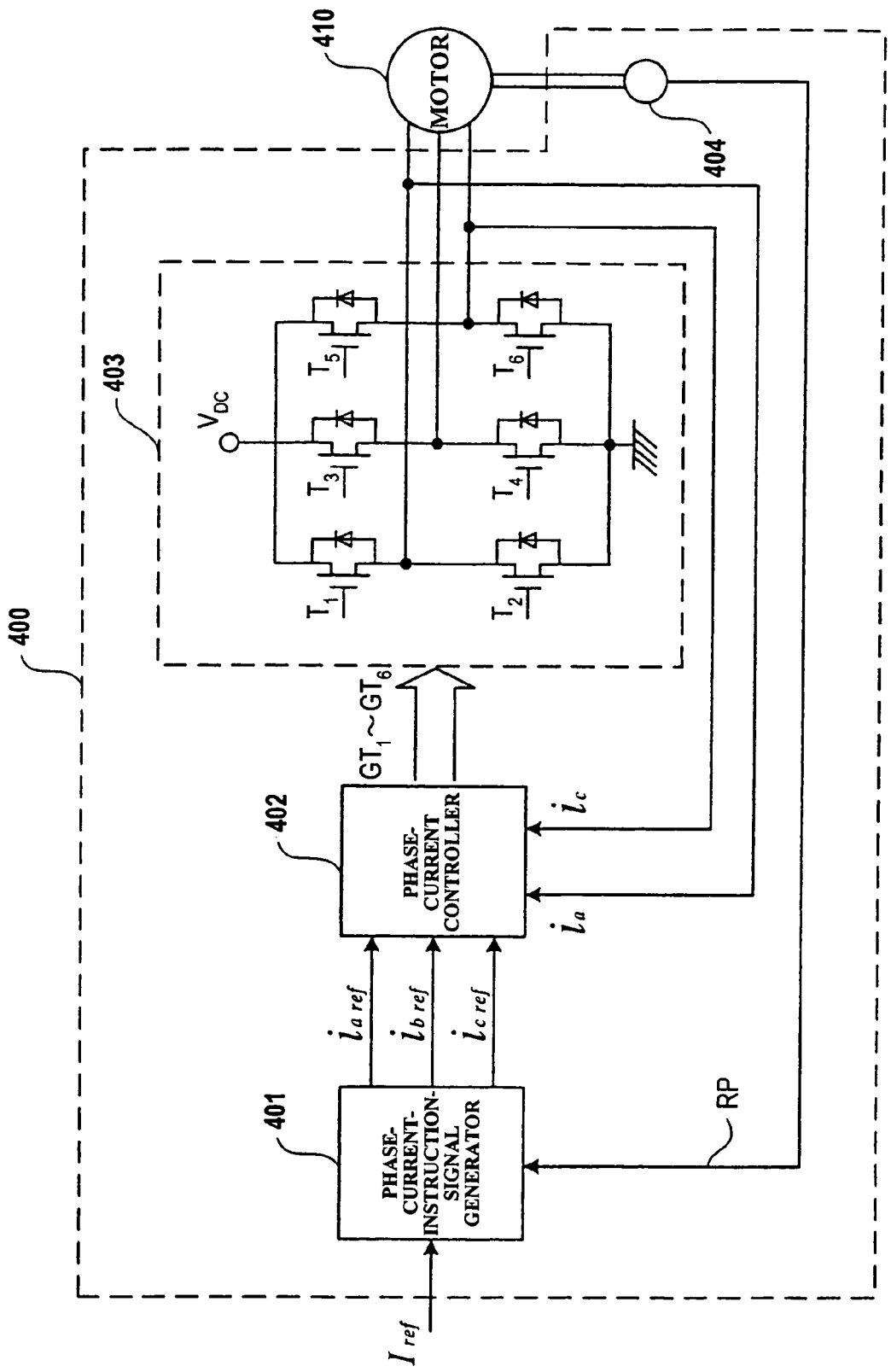
FIG. 20 is a block diagram of the structure of a brushless-motor drive controller according to the present invention.

A brushless-motor drive controller 400 according to the invention includes a phase-current-instruction-signal generator 401, a phase-current controller 402, a motor driving circuit 403, and a rotor-position detector 404 as shown in FIG. 20. The phase-current-instruction-signal generator 401 corresponds to an exciting-phase-current instruction-signal generating means and the phase-current controller 402 and the motor driving circuit 403 correspond to an exciting-current control means.

To the phase-current-instruction-signal generator 401, a motor-current instruction signal Iref from an external circuit (not shown) and a rotor-position signal RP from the rotor-position detector 404 are inputted. The phase-current-instruction-signal generator 401 generates respective exciting-phase-current instruction signals (iaref, ibref, and icref) of the exciting phases a, b, and c in accordance with the inputted signals. The phase-current controller 402 controls the detection of the respective exciting currents (ia, ib, and ic) of the exciting phases such that it detects also the two-phase current using a three-phase-current detection signal through the motor driving circuit 403 by current feedback control in accordance with the exciting-phase-current instruction signals (iaref, ibref, and icref) generated by the phase-current-instruction-signal generator 401.

The motor driving circuit 403 is constructed of a total of six transistors (field effect transistors: FETs) $T_1$ to $T_6$, three of which are arranged adjacent to the power source (upper stage) and three of which are arranged adjacent to the ground (lower stage). The six transistors are arranged such that corresponding upper and lower transistors are connected in series and the connections of the series transistor pairs ($T_1$–$T_2$, $T_3$–$T_4$, and $T_5$–$T_6$) are connected to the external ends of the exciting coils of a three-phase brushless DC motor 410. Gate driving signals $GT_1$ to $GT_6$ of the transistors $T_1$ to $T_6$ are produced by the phase-current controller 402 through the phase-current-instruction-signal generator 401 in accordance with the rotor-position signal RP detected from the rotor-position detector 404.

Commutation timing is generated from the rotor-position signal RP. The rotor-position signal RP is detected by the rotor-position detector 404 and is then sent to the phase-current-instruction-signal generator 401. The rotor-position detector 404 may be constructed of any of a hall element, a resolver, and an encoder.

Figure 21:
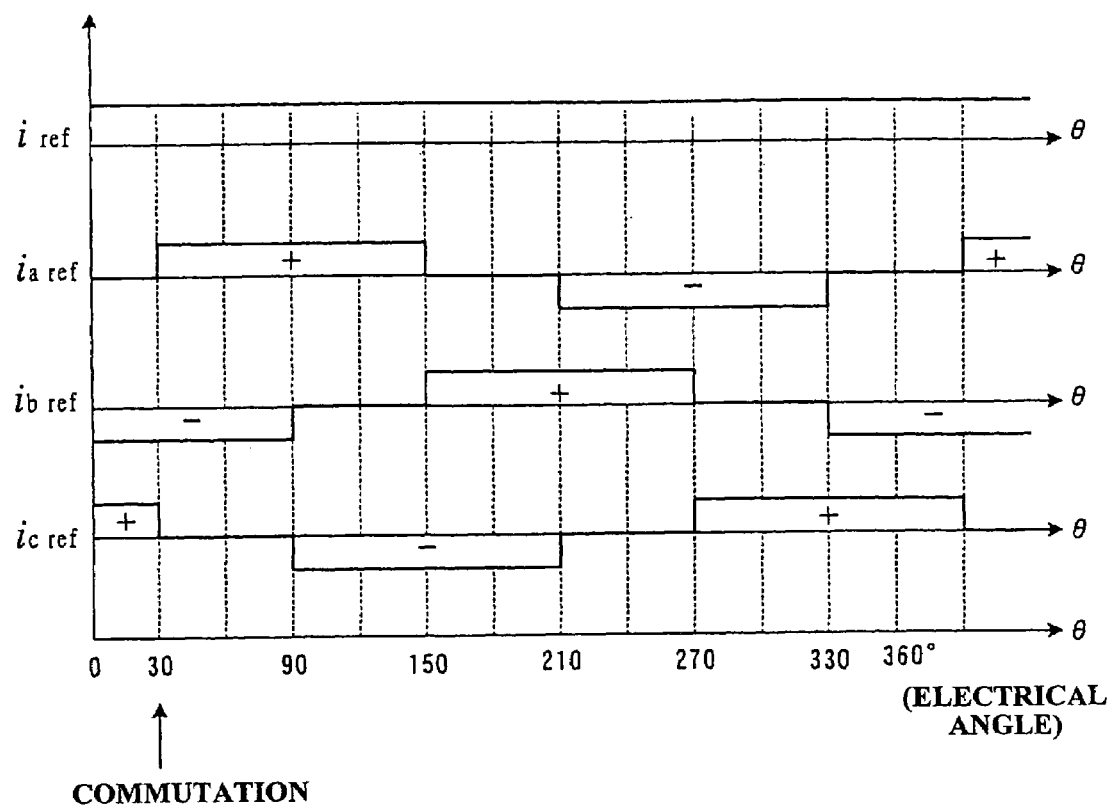
FIG. 21 is a wave-form chart of an example of a motor-current instruction signal and exciting-phase-current instruction signals of various exciting phases of a three-phase brushless motor.

FIG. 21 is a wave-form chart of an example of the motor-current instruction signal (Iref) and the exciting-phase-current instruction signals (iaref, ibref, and icref) in the exciting phases. As shown in the drawing, during no commutating period, the amplitudes of the energized exciting-phase-current instruction signals of the exciting phases are the same as that of the motor-current instruction signal, whose sign is opposite from that of the motor-current instruction signal and the amplitude of the nonenergized exciting-phase-current instruction signal of the exciting phase is zero.

As shown in FIG. 21, upon commutation, the nonenergized exciting-phase-current instruction signal iaref of a-phase as commutation phase rises from zero at, for example, an electrical angle of 30 degrees. The energized exciting-phase-current instruction signal icref of c-phase as commutation phase falls to zero.

With the above structure, a method will be described hereinafter for achieving high rpm of the brushless DC motor in a low-torque load range and reducing an increase in torque ripple therewith.

1. Achieving weakening field to realize high rpm by advancing the phase angle of the current waves of which commutation is controlled.

Figure 22:
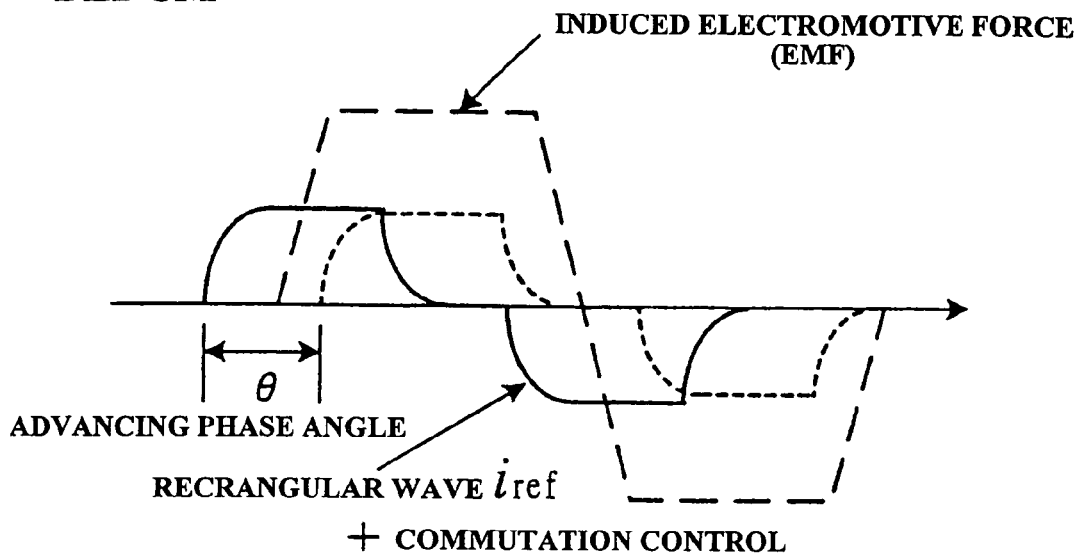
FIG. 22 is a wave-form chart of an exciting-phase-current instruction signal according to a first embodiment of the present invention.

Referring to FIG. 22, exciting-phase-current instruction signals with a waveform (the rectangular wave indicated by the solid line) in which the exciting-phase-current instruction signals in the exciting phases (the rectangular wave indicated by the dotted line) are advanced by an angle of θ are generated by the phase-current-instruction-signal generator 401. The phase-current controller 402 controls the respective exciting currents (ia and ic) of the exciting phases by current feedback control through the motor driving circuit 403 in accordance with the excitation-phase current instruction signals (iaref, ibref, and icref) generated by the phase-current-instruction-signal generator 401. Advancing the phase angle allows part of the currents to act to weaken the magnetic field and the other part acts to generate motor torque. The method of "weakening field" is a method of weakening the magnetic field to reduce total magnetic flux by using the characteristic that the maximum rpm is in inverse proportion to the total magnetic flux, thereby increasing the rpm. Also, the use of commutation control reduces the torque ripple. Specifically, the commutation control reduces the change in current because the current rises and falls more slowly than the conventional rectangular wave at the time of commutation. The phase-angle advancing function is added to the commutation control function, so that weakening field in the low torque range can be achieved and the torque ripple is also decreased as compared with the known art in which a rectangular wave is advanced.

2. Achieving weakening field to realize high rpm by advancing the phase angle of trapezoidal current waves.

Figure 23:
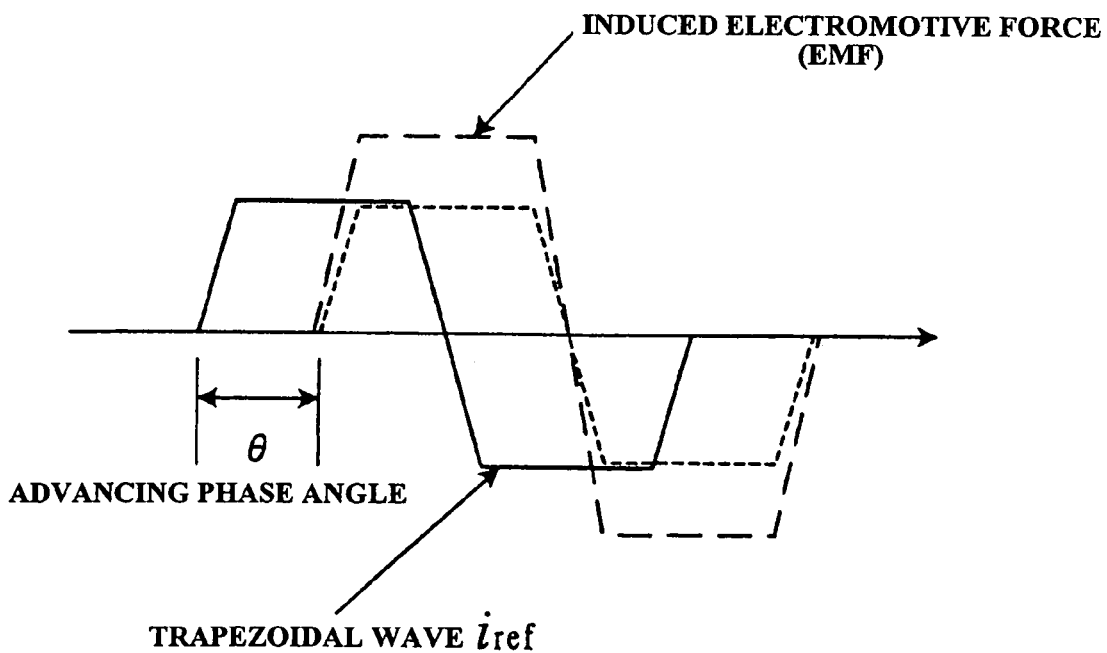
FIG. 23 is a wave-form chart of an exciting-phase-current instruction signal (trapezoidal wave) according to a second embodiment of the present invention.

Referring to FIG. 23, exciting-phase-current instruction signals with a waveform (the trapezoidal wave indicated by the solid line) in which the exciting-phase-current instruction signals in the exciting phases (the trapezoidal wave indicated by the dotted line) are advanced by an angle of θ are generated by the phase-current-instruction-signal generator 401. The phase-current controller 402 controls the respective exciting currents (ia and ic) of the exciting phases by current feedback control through the motor driving circuit 403 in accordance with the excitation-phase current instruction signals (iaref, ibref, and icref) generated by the phase-current-instruction-signal generator 401.

Since the trapezoidal wave changes in current more slowly at the time of commutation as compared with the rectangular wave, the torque ripple can be reduced.

3. Achieving weakening field to realize high rpm by advancing the phase angle of sine-wave currents.

Figure 24:
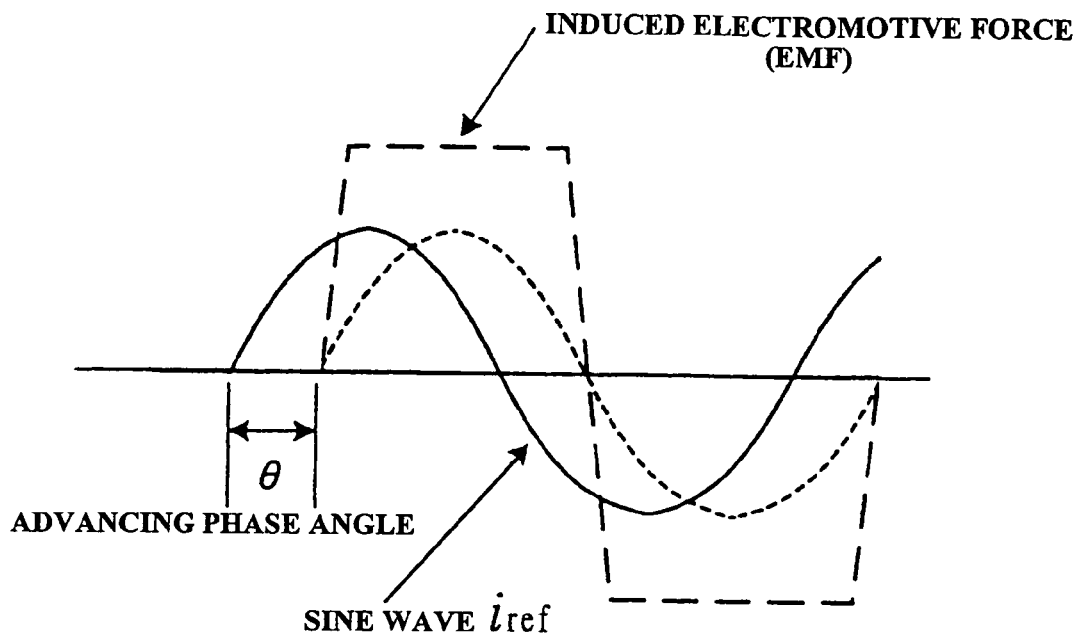
FIG. 24 is a wave-form chart of an exciting-phase-current instruction signal (sine wave) according to a third embodiment of the present invention.

Referring to FIG. 24, this is one in which the trapezoidal wave described in above paragraph 2. is replaced with a sine wave, which is capable of reducing the torque ripple for the same reason.

Figure 25:
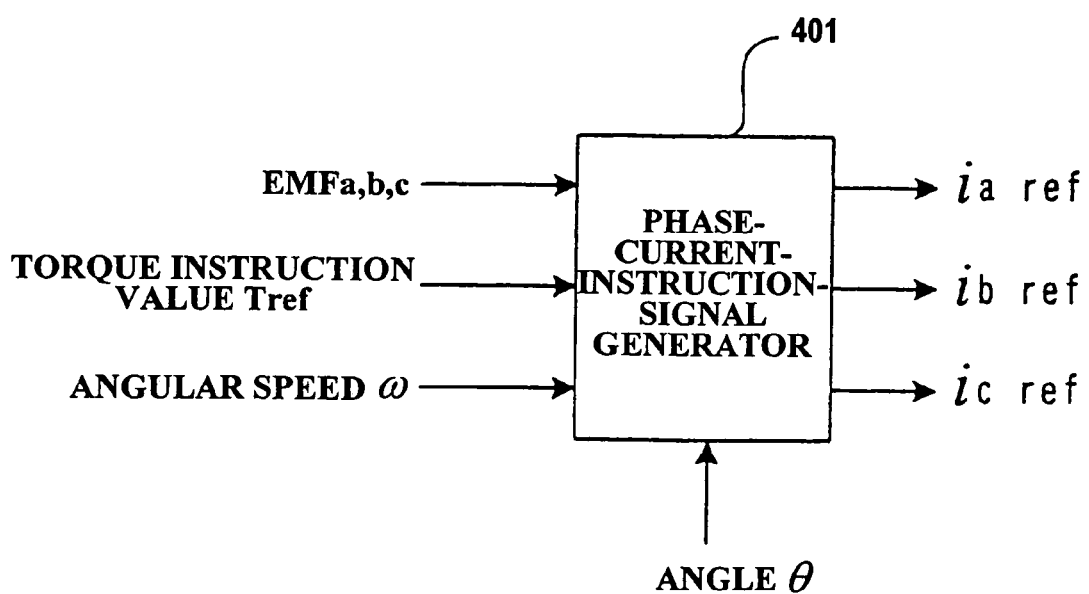
FIG. 25 is a diagram of the input/output of signals to a phase-current instruction signal generator according to a fourth embodiment of the present invention.

4. Referring to FIG. 25, producing exciting-phase-current instruction signals including phase-angle advancing from an induced electromotive force (EMF) waveform, a torque instruction value Tref, an angular speed ω, and a rotor rotation angle θ in the phase-current-instruction-signal generator 401 and, in accordance with that, controlling the exciting currents (ia and ic) of the exciting phases by current feedback control through the motor driving circuit 403. The rotor rotation angle θ is given by an angle estimation signal estimated from the rotor-position signal RP detected by the rotor-position detector 404, motor current, and so on.

While the invention has been made to increase the rpm and to reduce the torque ripple in a high rpm range (low-torque load range), it is more efficient in a rated load range (normal rpm range) to use the motor current to generate torque than to advance the phase angle.

Accordingly, it is preferable to switch the control means from normal commutation control to any of the control means described in above paragraph 1. to 4. with shifting from the normal rpm range to a high rpm range.

It is also preferable to switch the control means such that a reference angular speed is stored in the phase-current-instruction-signal generator 401 so that the control means is switched when the motor rotation speed (angular speed) exceeds a predetermined value and, when the actual angular speed exceeds the reference value, the control means is switched to any of the control means described in above paragraph 1. to 4. with a switching means (not shown).

As set forth hereinabove, the use of the motor-wiring bus bars suitable for reducing the size of a motor, according to the invention, offers the advantage of providing a compact motor. The use of the method for manufacturing the motor-wiring bus bars according to the invention offers the advantage of manufacturing a motor including economical motor-wiring bus bars in which the material is not wasted.

With the permanent magnet motor according to the invention, for a permanent-magnet motor including a distributed-coil stator driven with a rectangular-wave current (120-degree energization), which requires low torque ripple, the combination of the angle widths of the teeth and the every other pole distributed winding (one coil for one slot) are adopted so that the phases of the voltage induced in the coils become equal in phase. This allows the torque ripple not to be increased, the torque constant not to be reduced, and the cogging torque to be significantly decreased. This offers a remarkable advantage of providing a permanent-magnet motor with low vibration and low noise.

According to the brushless DC motor of the invention, the slot opening width S between the teeth is set smaller than the space length G between the rotor and the stator core and larger than $\alpha G$. This offers the advantages that the operability of the steering of an electrically driven power steering system is not lowered, output is not reduced, and the motor lock of the brushless DC motor is prevented at low cost.

With the brushless-motor drive controller according to the invention, a compact brushless motor with high output and low torque ripple can be achieved, so that high rpm with low noise can be achieved in a low-torque load range.

What is claimed is:

1. A three-phase permanent-magnet motor, comprising:
a distributed-coil stator,
wherein:
said motor is operable to be driven with a rectangular-wave current; and wherein S/2 mp=1;
where S is number of slots, m is number of phases of said motor, and $p \geq 2$ and 1p is number of poles; and
when p is an even number, a cycle of angle width of teeth is expressed as 360/S×4 and,
when p is an odd number, said cycle of angle width of teeth is expressed as 360/S×6.

2. The permanent-magnet motor of claim 1, wherein:
with respect to a kind of angle width of teeth in one cycle,
when p is an even number, said kind of angle width of teeth in one cycle is set to three kinds, and
when p is an odd number, said kind of angle width of teeth in one cycle is set to four kinds;
and with respect to combination of teeth in one cycle,
teeth of odd-number are set to same angle width and,
teeth of even-number are set to different angle width respectively.

3. The permanent-magnet motor of claim 1, wherein:
with respect to a kind of angle width of teeth in one cycle,
when p is an even number, said kind of angle width of teeth in one cycle is set to three kinds, and
when p is an odd number, said kind of angle width of teeth in one cycle is set to four kinds;
and with respect to combination of teeth in one cycle,
teeth of even-number are set to same angle width and,
teeth of odd-number are set to different angle width respectively.

4. The permanent-magnet motor of claim 1, wherein, every other pole is wound, with one coil for one slot, so that voltages induced in coils are equal in phase.

5. The permanent-magnet motor according to claim 2, wherein, when $\theta$ is equally spaced angle width and $\alpha$ is a range of possible values for said angle width of teeth, said range of $\alpha$ is expressed as a $\cdot \theta \leq \alpha \leq b \cdot \theta$, where coefficients a and b are determined by torque constant or reduction ratio of cogging-torque.

6. The permanent-magnet motor according to claim 3, wherein, when $\theta$ is equally spaced angle width and $\alpha$ is a range of possible values for said angle width of teeth, said range of $\alpha$ is expressed as a $\cdot \theta \leq \alpha \leq b \cdot \theta$, where coefficients a and b are determined by torque constant or reduction ratio of cogging-torque.

* * * * *